United States Patent
DeWaard

(10) Patent No.: US 10,603,675 B2
(45) Date of Patent: Mar. 31, 2020

(54) SYSTEMS AND METHODS FOR EXTRACTING PARTICULATE FROM RAW SLURRY MATERIAL

(71) Applicant: Daritech, Inc., Lynden, WA (US)

(72) Inventor: David DeWaard, Lynden, WA (US)

(73) Assignee: Dari-Tech, Inc., Lynden, WA (US)

( * ) Notice: Subject to any disclaimer, the term of this patent is extended or adjusted under 35 U.S.C. 154(b) by 1159 days.

(21) Appl. No.: 14/928,296

(22) Filed: Oct. 30, 2015

(65) Prior Publication Data

US 2016/0121339 A1    May 5, 2016

Related U.S. Application Data

(60) Provisional application No. 62/074,086, filed on Nov. 2, 2014.

(51) Int. Cl.
| | | |
|---|---|---|
| *B01D 33/11* | (2006.01) | |
| *B03B 5/28* | (2006.01) | |
| *B03B 11/00* | (2006.01) | |
| *B01D 33/067* | (2006.01) | |

(52) U.S. Cl.
CPC .............. *B03B 5/28* (2013.01); *B01D 33/067* (2013.01); *B01D 33/11* (2013.01); *B03B 11/00* (2013.01); *B03B 2011/002* (2013.01)

(58) Field of Classification Search
USPC ........................................................ 210/403
See application file for complete search history.

(56) References Cited

U.S. PATENT DOCUMENTS

| | | |
|---|---|---|
| 683,826 A | 10/1901 | Wells |
| 832,191 A | 10/1906 | Holzer |
| 992,629 A | 5/1911 | Akins |
| 1,347,724 A | 7/1920 | Ernst |
| 1,658,040 A | 2/1928 | Cohn |
| 1,726,608 A | 9/1929 | Whitwell |
| 1,993,214 A | 3/1935 | Hass |
| 2,066,479 A | 1/1937 | Macisaac |
| 2,278,525 A | 4/1942 | Rich |
| 2,630,906 A | 3/1953 | Philipp |

(Continued)

FOREIGN PATENT DOCUMENTS

| | | |
|---|---|---|
| CA | 2336838 | 3/2005 |
| CA | 2690420 A1 | 7/2010 |

(Continued)

OTHER PUBLICATIONS

USPTO, "Non-Final Office Action, U.S. Appl. No. 14/929,666," dated Nov. 22, 2017, 31 pages.

(Continued)

*Primary Examiner* — Thomas M Lithgow
(74) *Attorney, Agent, or Firm* — Williams, Kastner & Gibbs PLLC; Mark Lawrence Lorbiecki

(57) ABSTRACT

A separation system for separating solids from a slurry of waste material, the separation system comprising a housing, a drum assembly, and a drive assembly. The housing defines a collection chamber. Liquid within the collection chamber defines a liquid level. The drum assembly defines a perforated cylindrical wall and the drum assembly is supported such that at least a portion of the drum assembly is below the liquid level. The drive assembly rotates the drum assembly relative to the housing.

14 Claims, 17 Drawing Sheets

(56) References Cited

U.S. PATENT DOCUMENTS

| | | | |
|---|---|---|---|
| 2,680,602 | A | 6/1954 | Nelson et al. |
| 2,747,741 | A | 5/1956 | Jacobson |
| 2,942,731 | A | 6/1960 | Soldini |
| 2,982,411 | A | 5/1961 | Fontein |
| 3,007,518 | A | 11/1961 | Simpson |
| 3,333,700 | A | 8/1967 | Coleman |
| 3,440,674 | A | 4/1969 | Carver et al. |
| 3,527,668 | A | 9/1970 | Kusters |
| 3,606,945 | A | 9/1971 | Watson et al. |
| 3,626,486 | A | 12/1971 | Bugbee et al. |
| 3,649,708 | A | 3/1972 | Schroeder et al. |
| 3,730,887 | A | 5/1973 | Suzuki et al. |
| 3,736,111 | A | 5/1973 | Gardner et al. |
| 3,736,120 | A | 5/1973 | Tempe |
| 3,761,237 | A | 9/1973 | Jeffreys |
| 3,772,144 | A | 11/1973 | Luthi et al. |
| 3,773,659 | A | 11/1973 | Carlson et al. |
| 3,865,727 | A | 2/1975 | Baker et al. |
| 3,886,063 | A | 5/1975 | Friesz |
| 3,971,720 | A | 7/1976 | Swanson et al. |
| 3,979,289 | A | 9/1976 | Bykowski et al. |
| 3,982,499 | A | 9/1976 | Frankl |
| 4,062,779 | A | 12/1977 | Nakamura et al. |
| 4,097,379 | A | 6/1978 | Shelstad |
| 4,121,539 | A | 10/1978 | Moore |
| 4,160,724 | A | 7/1979 | Laughton |
| 4,192,745 | A | 3/1980 | Hood |
| 4,193,206 | A | 3/1980 | Maffet |
| 4,285,816 | A | 8/1981 | Lee |
| 4,303,523 | A | 12/1981 | Ruppnig |
| 4,310,424 | A | 1/1982 | Fremont et al. |
| 4,315,821 | A | 2/1982 | Climenhage |
| 4,324,659 | A | 4/1982 | Titoff |
| 4,364,831 | A | 12/1982 | Burns et al. |
| 4,382,857 | A | 5/1983 | Laughlin |
| 4,395,331 | A | 7/1983 | Andersson |
| 4,416,764 | A | 11/1983 | Gikis et al. |
| 4,460,470 | A | 7/1984 | Reimann |
| 4,507,202 | A | 3/1985 | Nord et al. |
| 4,608,157 | A | 8/1986 | Graves |
| 4,701,266 | A | 10/1987 | Janka et al. |
| 4,842,722 | A | 6/1989 | Holz |
| 4,849,105 | A | 7/1989 | Borchert |
| 4,867,870 | A | 9/1989 | Kettlety et al. |
| 4,880,530 | A | 11/1989 | Frey |
| 5,022,989 | A | 6/1991 | Put |
| 5,030,348 | A | 7/1991 | Bengt |
| 5,041,223 | A | 8/1991 | Johansson et al. |
| 5,098,572 | A | 3/1992 | Faup et al. |
| 5,133,872 | A | 7/1992 | Baldwin et al. |
| 5,275,728 | A | 1/1994 | Koller |
| 5,290,451 | A | 3/1994 | Koster et al. |
| 5,372,713 | A | 12/1994 | Huber |
| 5,409,610 | A | 4/1995 | Clark |
| 5,466,189 | A | 11/1995 | Deutsch et al. |
| 5,472,472 | A | 12/1995 | Northrop |
| 5,507,396 | A | 4/1996 | Hauch |
| 5,520,779 | A | 5/1996 | Bold |
| 5,524,796 | A | 6/1996 | Hyer |
| 5,531,898 | A | 7/1996 | Wickham |
| 5,587,073 | A | 12/1996 | Zittel |
| 5,728,297 | A | 3/1998 | Koller |
| 5,817,241 | A | 10/1998 | Brayboy |
| 5,885,461 | A | 3/1999 | Tetrault et al. |
| 5,894,936 | A | 4/1999 | Sanders et al. |
| 5,910,243 | A | 6/1999 | Bruke |
| 5,950,839 | A | 9/1999 | Wedel |
| 6,039,874 | A | 3/2000 | Teran et al. |
| 6,044,980 | A | 4/2000 | Houle |
| 6,077,548 | A | 6/2000 | Lasseur et al. |
| 6,083,386 | A | 7/2000 | Lloyd |
| 6,096,201 | A | 8/2000 | Bruke |
| 6,105,536 | A | 8/2000 | DeWaard |
| 6,109,450 | A | 8/2000 | Grunenwald et al. |
| 6,136,185 | A | 10/2000 | Sheaffer |
| 6,190,566 | B1 | 2/2001 | Kolber |
| 6,193,889 | B1 | 2/2001 | Teran et al. |
| 6,227,379 | B1 | 5/2001 | Nesseth |
| 6,231,631 | B1 | 5/2001 | Suzuki |
| 6,245,121 | B1 | 6/2001 | Lamy et al. |
| 6,346,240 | B1 | 2/2002 | Moore |
| 6,355,167 | B1 | 3/2002 | Wensauer |
| 6,375,844 | B1 | 4/2002 | Ehrlich |
| 6,387,267 | B1 | 5/2002 | Kantardjieff |
| 6,398,959 | B1 | 6/2002 | Teran et al. |
| 6,443,094 | B1 | 9/2002 | DeWaard |
| 6,470,828 | B1 | 10/2002 | Townsend et al. |
| 6,663,782 | B2 | 12/2003 | Morse et al. |
| 6,890,429 | B2 | 5/2005 | Herring |
| 6,908,554 | B2 | 6/2005 | Jackson |
| 6,997,135 | B2 | 2/2006 | DeWaard |
| 7,001,512 | B1 | 2/2006 | Newsome |
| 7,005,068 | B2 | 2/2006 | Hoffland |
| 7,051,962 | B2 | 5/2006 | Whitsel et al. |
| 7,067,065 | B2 | 6/2006 | Schloss |
| 7,255,223 | B2 | 8/2007 | Schaer et al. |
| 7,258,238 | B2 | 8/2007 | Raghupathy |
| 7,306,731 | B1 | 12/2007 | DeWaard |
| 7,461,744 | B2 | 12/2008 | Hautala et al. |
| 7,631,595 | B1 | 12/2009 | DeWaard |
| 7,891,496 | B2 | 2/2011 | Fendley |
| 7,964,105 | B2 | 6/2011 | Moss |
| 7,972,517 | B1 | 7/2011 | Miller |
| 7,987,770 | B2 | 8/2011 | Klump et al. |
| 7,987,778 | B1 | 8/2011 | DeWaard |
| 8,142,667 | B2 | 3/2012 | DeWaard |
| 8,201,495 | B2 | 6/2012 | DeWaard |
| 8,317,034 | B2 * | 11/2012 | Fetrow ............ B03B 5/56 210/360.1 |
| 8,470,183 | B2 | 6/2013 | DeWaard |
| 8,544,383 | B2 | 10/2013 | Courtemanche et al. |
| 8,889,016 | B2 | 11/2014 | DeWaard |
| 8,926,846 | B2 | 1/2015 | DeWaard |
| 9,352,983 | B2 | 5/2016 | Massey et al. |
| 9,597,618 | B2 | 3/2017 | DeWaard |
| 9,610,521 | B2 | 4/2017 | DeWaard |
| 2001/0013497 | A1 | 8/2001 | Kolber |
| 2002/0020677 | A1 | 2/2002 | Noll |
| 2002/0079266 | A1 | 6/2002 | Ainsworth et al. |
| 2002/0084227 | A1 | 7/2002 | Sower |
| 2002/0086077 | A1 | 7/2002 | Noller et al. |
| 2003/0057160 | A1 | 3/2003 | Williams et al. |
| 2004/0074835 | A1 | 4/2004 | Yoshimoto et al. |
| 2004/0154988 | A1 | 8/2004 | Sheets |
| 2004/0159608 | A1 | 8/2004 | Hoffland |
| 2006/0191828 | A1 | 8/2006 | Cummins |
| 2006/0266676 | A1 | 11/2006 | Bossen |
| 2006/0273048 | A1 | 12/2006 | Doyle et al. |
| 2007/0289917 | A1 | 12/2007 | Mylin et al. |
| 2008/0110838 | A1 | 5/2008 | Moss |
| 2009/0057235 | A1 | 3/2009 | Sugaya et al. |
| 2009/0090679 | A1 | 4/2009 | DeWaard |
| 2009/0149571 | A1 | 6/2009 | Lux et al. |
| 2010/0112632 | A1 | 5/2010 | DeWaard |
| 2011/0036769 | A1 | 2/2011 | Homma et al. |
| 2011/0100930 | A1 | 5/2011 | DeWaard |
| 2011/0198268 | A1 | 8/2011 | DeWaard |
| 2011/0233132 | A1 | 9/2011 | Wietham |
| 2011/0253227 | A1 | 10/2011 | DeWaard |
| 2011/0309039 | A1 | 12/2011 | DeWaard |
| 2012/0000863 | A9 | 1/2012 | DeWaard |
| 2012/0031856 | A1 | 2/2012 | Courtemanche et al. |
| 2012/0132734 | A1 | 5/2012 | DeWaard |
| 2012/0138515 | A1 | 6/2012 | DeWaard |
| 2012/0247927 | A1 | 10/2012 | Marchesini |
| 2013/0299395 | A1 | 11/2013 | DeWaard |
| 2014/0083957 | A1 | 3/2014 | DeWaard |
| 2014/0091043 | A1 | 4/2014 | DeWaard |
| 2015/0008193 | A1 | 1/2015 | DeWaard |
| 2015/0053594 | A1 | 2/2015 | DeWaard |
| 2015/0076084 | A1 | 3/2015 | Tange |
| 2015/0083672 | A1 | 3/2015 | DeWaard |
| 2015/0122747 | A1 | 5/2015 | DeWaard |
| 2015/0251112 | A1 | 9/2015 | DeWaard |

(56) References Cited

U.S. PATENT DOCUMENTS

| | | |
|---|---|---|
| 2015/0343343 A1 | 12/2015 | DeWaard |
| 2016/0100620 A1 | 4/2016 | Massey et al. |
| 2017/0209818 A1 | 7/2017 | DeWaard |

FOREIGN PATENT DOCUMENTS

| | | |
|---|---|---|
| CA | 2719630 A1 | 5/2011 |
| CA | 2732065 A1 | 8/2011 |
| CA | 2737609 A1 | 10/2011 |
| CA | 2764679 A1 | 7/2012 |
| CN | 201150915 | 11/2008 |
| CN | 103771645 A | 5/2014 |
| DE | 4042167 A | 7/1991 |
| DE | 4239083 A1 | 6/1993 |
| DE | 4337890 A1 | 5/1994 |
| EP | 0126655 A2 | 11/1984 |
| EP | 0565268 A2 | 10/1993 |
| EP | 1327470 B1 | 8/2005 |
| JP | 5626697 A | 3/1981 |
| JP | 0985122 A | 3/1997 |
| SE | 434014 B | 7/1984 |
| WO | 9507744 A1 | 3/1995 |
| WO | 2011029200 A1 | 3/2011 |

OTHER PUBLICATIONS

USPTO, "Final Office Action, U.S. Appl. No. 14/699,608", dated May 30, 2018, 13 pages.
Canadian Intellectual Property Office, "Office Action, Application No. 2,764,679", dated Aug. 16, 2017, 3 pages.
European Patent Office, Examination Report, 12000305.8, dated May 26, 2017, 4 pages.
USPTO, "Non-Final Office Action, U.S. Appl. No. 14/322,858," dated Oct. 3, 2017, 10 pages.
USPTO, "Non-Final Office Action, U.S. Appl. No. 14/699,608," dated Oct. 2, 2017, 24 pages.
USPTO, "Non-Final Office Action, U.S. Appl. No. 14/722,590," dated Sep. 19, 2017, 30 pages pages.
USPTO, "Non-Final Office Action, U.S. Appl. No. 14/726,848," dated Sep. 27, 2017, 19 pages.
USPTO, "Non-Final Office Action, U.S. Appl. No. 14/699,608," dated Feb. 12, 2019, 18 pages.
USPTO, "Final Office Action, U.S. Appl. No. 14/722,590", dated May 1, 2018, 12 pages.
Canadian Intellectual Property Office, "Official Action", Application No. 2,890,558, dated Aug. 20, 2018, 4 pages.
USPTO, "Non-Final Office Action, U.S. Appl. No. 14/722,590," dated Aug. 13, 2018, 10 pages.
USPTO, "Non-Final Office Action, U.S. Appl. No. 15/464,125," dated Jun. 20, 2018, 8 pages.
USPTO, "Final Office Action, U.S. Appl. No. 14/699,608", dated Jun. 14, 2017, 8 pages.
USPTO, "Final Office Action, U.S. Appl. No. 14/722,590", dated Jun. 23, 2017, 12 pages.
USPTO, "Final Office Action, U.S. Appl. No. 14/726,848", dated Mar. 8, 2018, 15 pages.
Accent Manufacturing, "TFSS 60 Sand Trap," Brochure found on Website http://www.accentmanufacturing.com/sand-separator.html, Predates 2008, 4 pages.
Daritech, Inc., "Air Knife" Brochure, Offer for Sale Jul. 1, 2013, 2 pages.
Daritech, Inc., "EYS Separator" Brochure, Jun. 2008, 2 pages.
Daritech, Inc., "EYS Separator" Brochure, May 2008, 4 pages.
Daritech, Inc., "Roller Press" Brochure, Feb. 2010, 2 pages.
Daritech, Inc., "Roller Press" Brochure, Sep. 2008, 1 page.
McLanahan Agricultural Systems, "Sand Solutions" Brochure, Predates 2008, 8 pages.
Parkson Corporation, "Parkson Sand Saver," found on Website http://www.henkhuizenga.com/parsonsandseparator.htm, Predates 2008, 27 pages.

\* cited by examiner

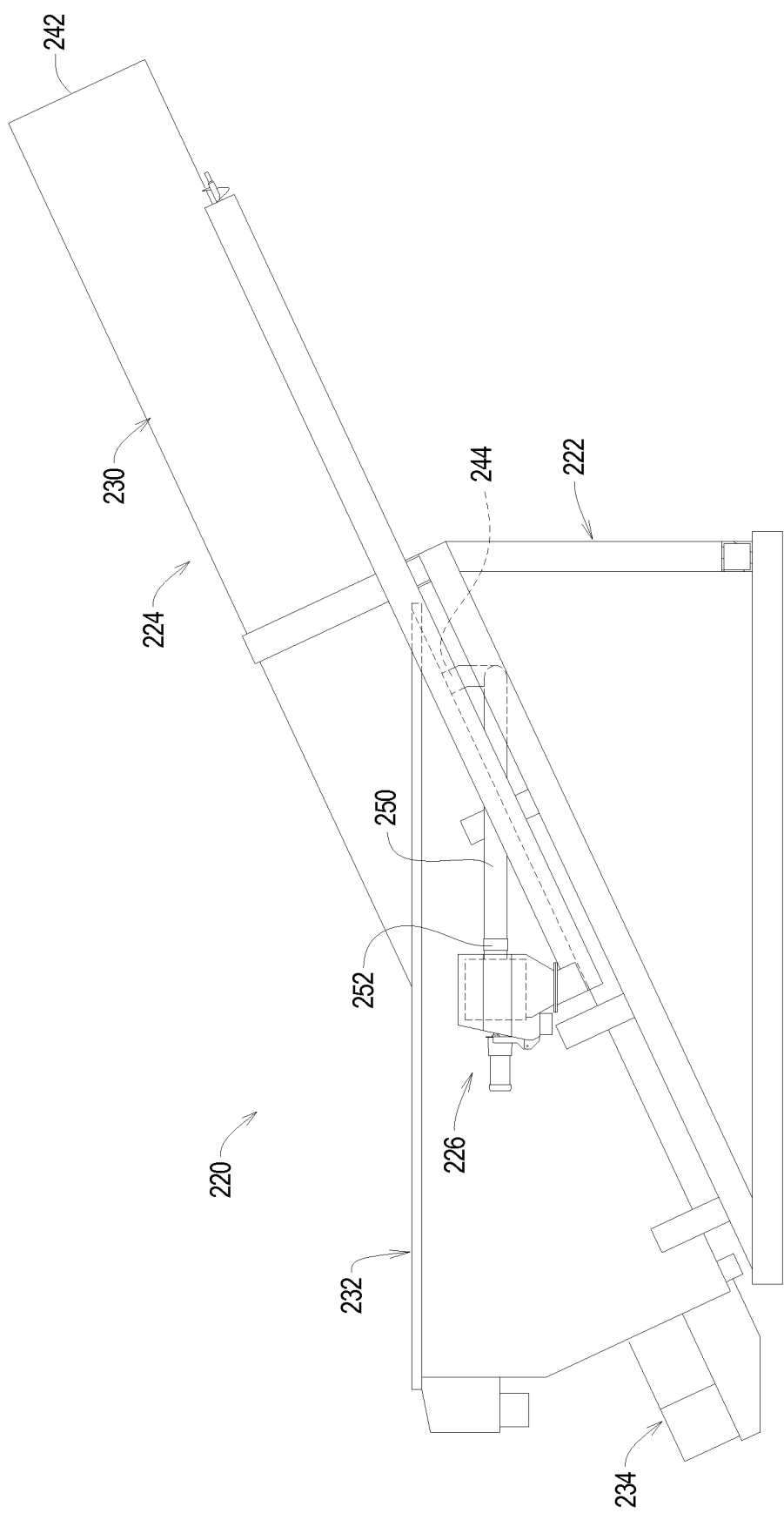

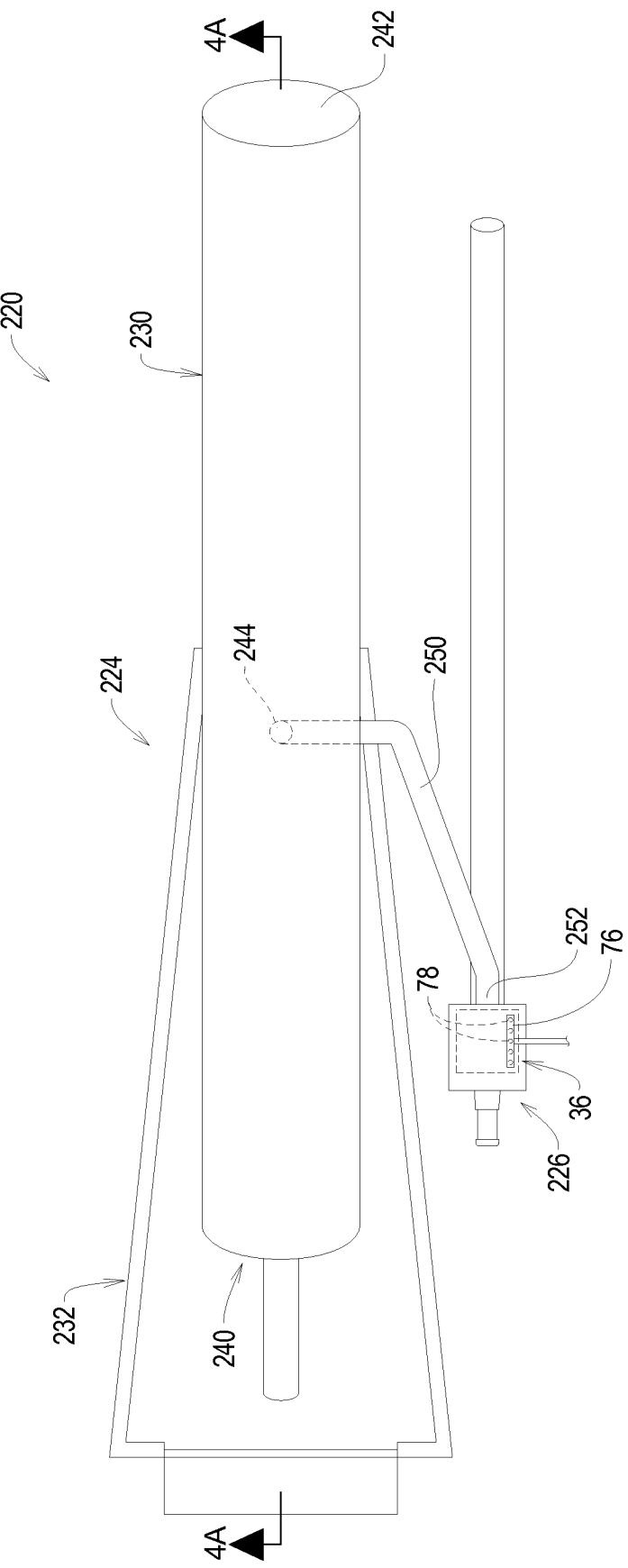

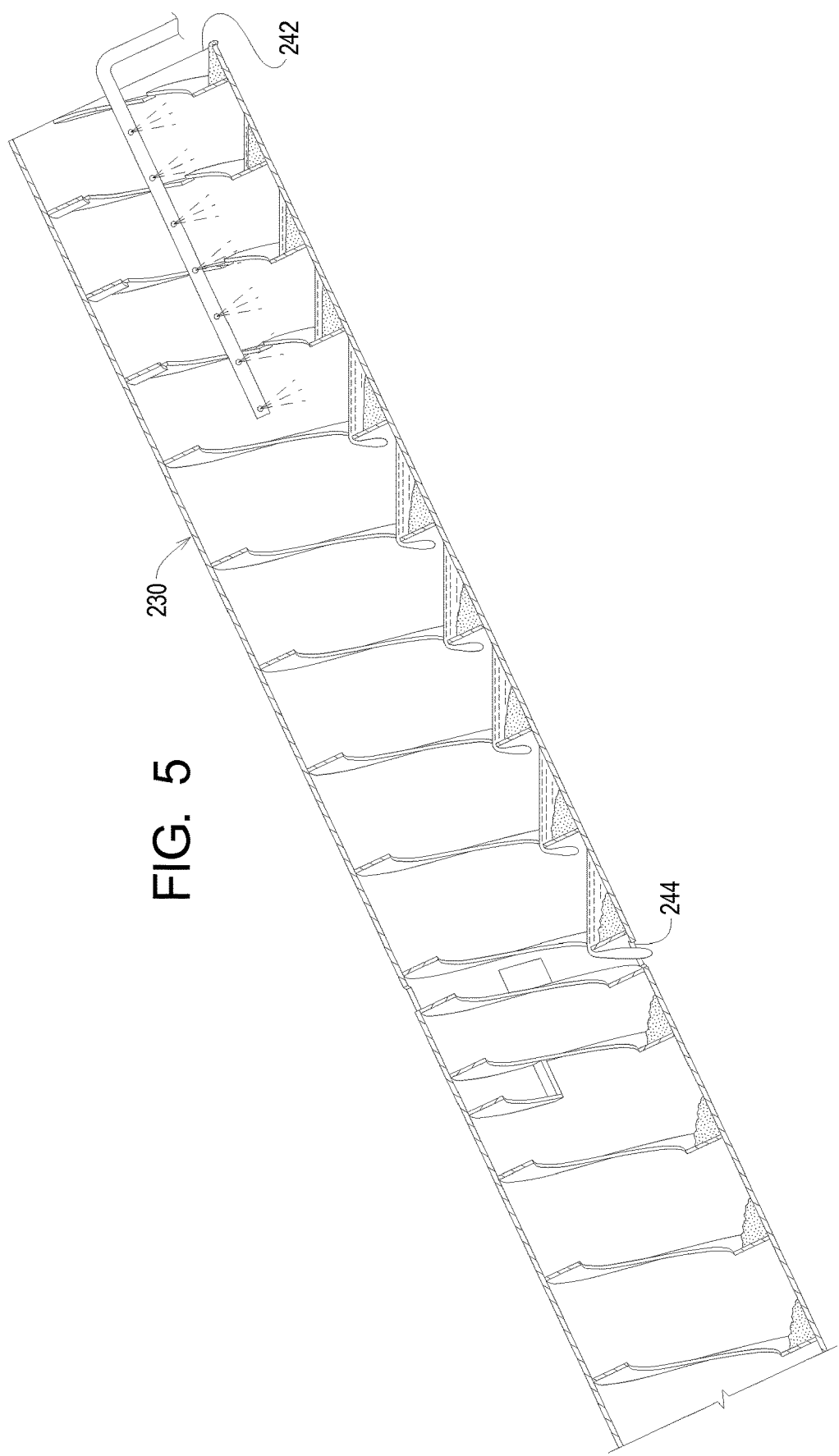

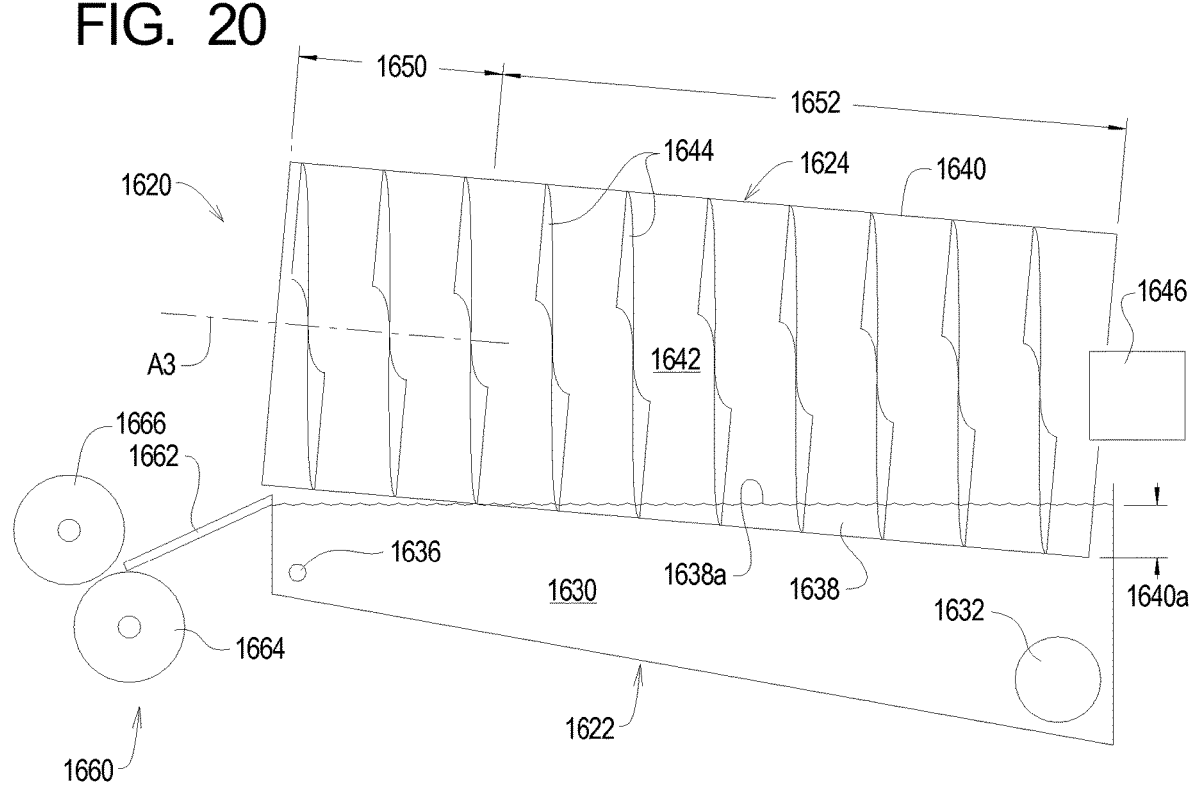

SYSTEMS AND METHODS FOR EXTRACTING PARTICULATE FROM RAW SLURRY MATERIAL

RELATED APPLICATIONS

This application, U.S. patent application Ser. No. 14/928,296 filed Oct. 30, 2015, claims benefit of U.S. Provisional Application Ser. No. 62/074,086 filed Nov. 2, 2014.

The contents of all related applications are incorporated herein by reference.

TECHNICAL FIELD

The present invention relates to the extraction of solid particulates from raw slurry material and, in particular, to the extraction of relatively small, heavy solid particulates such as sand from raw slurry material comprising at least water, small, relatively heavy particulate material such as sand, and small, relatively light particulate material such as fibers.

BACKGROUND

In many situations, it is desirable to separate a slurry of raw material into constituent solid and liquid components. For example, while the general composition of municipal waste may be known, any particular gallon of municipal waste may contain a variety of unknown solid or liquid components. Before municipal waste can be introduced into the environment, it is typically processed to remove at least a portion of the liquid or solid components thereof. Municipal waste is thus typically processed in a variety of stages designed to remove liquid and solid materials that might be unsuitable for discharge into the environment.

Modern animal husbandry operations such as dairy farms represent another example of a system in which the processing of a slurry of raw material to remove solid particulates is advantageous. The present invention is of particular significance in the context of processing waste from a dairy farm, and that application of the present invention will be described in detail herein. However, the principles of the present invention may be applied to any system in which a slurry of raw material is processed to remove solid components from the slurry.

Dairy farms often require the handling of relatively large numbers of animals in indoor facilities. For example, cows in a dairy operation are kept at least part of the day in stalls defining a stall resting surface. The stall resting surface should be covered with bedding material that is comfortable to lie on, provides uniform support, is cool in the summer, is non-abrasive, and provides confident footing during reclining and rising maneuvers. From the perspective of the operator of the dairy facility, bedding material should not be detrimental to the health of the cows or the quality of the milk produced by the cows. Sand has been proven to be advantageous as a bedding material and is commonly used in modern dairy operations.

When sand is used as a bedding material, the sand often becomes mixed with manure and other materials that collect within a dairy facility. When cleaning systems are used to remove manure from the diary facility, raw slurry material is formed containing rinse liquids, liquid manure, solid manure, relatively heavy solids such as sand, relatively light solids such as fibers and/or corn, and possibly other contaminants. The term "relatively heavy" is used herein to refer to a material with a density greater than that of water, while the term "relatively lighter" is used herein to refer to a material with a density less than that of water.

When possible, it is desirable to convert components of the raw slurry mixture to usable materials and/or reuse the components of the raw slurry mixture. In the context of a dairy facility, sand used as bedding material represents a cost. To reuse the sand as bedding material, the sand must be clean. On the other hand, if manure and other digestible materials are to be converted to energy using an anaerobic digester, removal of non-digestible materials such as sand allows the anaerobic digester to operate more efficiently.

In addition, certain separation systems are highly effective at removing large amounts of relatively heavy particulate such as sand from a raw slurry. However, these separation systems employ a substantial amount turbulence that tends to cause smaller particulates (fine sand) to be suspended within rinse water. Accordingly, although a particulate material may be more dense than water, that relatively heavy particulate can carried with rinse water out of the separation system. Such relatively heavy particulate that is carried with rinse water out of a separation system will be said to have bypassed the separation system.

The present invention relates to the separation of raw slurry materials into its constituent components such as manure, waste and rinse liquids, relatively light (e.g., less dense than water) fiber components such as corn, and relatively heavy (e.g., more dense than water) non-digestible components such as sand. Removal of sand from the raw slurry material further forms a processed slurry (low sand content) that is more appropriate for further processing operations such as extraction of water, composting, and/or digesting.

SUMMARY

The present invention may be embodied as a separation system for separating solids from a slurry of waste material, the separation system comprising a housing, a drum assembly, and a drive assembly. The housing defines a collection chamber. Liquid within the collection chamber defines a liquid level. The drum assembly defines a perforated cylindrical wall and the drum assembly is supported such that at least a portion of the drum assembly is below the liquid level. The drive assembly rotates the drum assembly relative to the housing.

The present invention may also be embodied as a method of separating solids from a slurry of waste material comprising the following steps. A housing and a drum assembly are provided. The housing defines a collection chamber. Liquid is arranged within the collection chamber defines a liquid level. The drum assembly defines a perforated cylindrical wall and the drum assembly is supported such that at least a portion of the drum assembly is below the liquid level. The drum assembly is rotated relative to the housing.

The present invention may also be embodied as a separation system for feed material into portions comprising a housing, a drum assembly, and a drive assembly. The housing defines a collection chamber, and feed material within the collection chamber defines a liquid level. The drum assembly comprises a drum member defining a perforated cylindrical wall and an exit end and at least one screw flight within the drum member. The drum assembly is supported such that at least a portion of the drum assembly is below the liquid level. The drive assembly rotates the drum assembly relative to the housing such that a first portion of the feed material exits the drum assembly through the perforations and the screw flight displaces a second portion of the feed material such that the second portion of the feed material exits the collection chamber through the exit end of the drum member.

The present invention may also be embodied as a method of separating feed material into portions comprising the following steps. A housing defining a collection chamber is provided. A drum assembly is provided. The drum assembly comprises a drum member defining a perforated cylindrical wall and an exit end and at least one screw flight within the drum member. Feed material is arranged within the collection chamber to define a liquid level. The drum assembly is supported within the collection chamber such that at least a portion of the drum assembly is below the liquid level. The drum assembly is rotated relative to the housing such that the first portion of the feed material exits the drum assembly through the perforations and the screw flight displaces the second portion of the feed material such that the second portion of the feed material exits the drum assembly through the exit end.

The present invention may also be embodied as a separation system for feed material comprising liquids, sand, and floating solids comprising a housing, a drum assembly, and a drive assembly. The housing defines a collection chamber, and feed material within the collection chamber defines a liquid level. The drum assembly comprises a drum member defining a perforated cylindrical wall and an exit end and at least one screw flight within the drum member. The drum assembly is supported such that at least a portion of the drum assembly is below the liquid level. The drive assembly rotates the drum assembly relative to the housing such that a first portion of the feed material primarily comprising liquids and sand exits the drum assembly through the perforations and the screw flight displaces a second portion of the feed material primarily comprising floating solids such that the second portion of the feed material exits the collection chamber through the exit end of the drum member.

BRIEF DESCRIPTION OF THE DRAWINGS

FIG. 3 is a side elevation view of a second example separation system of the present invention;

FIG. 4 is a top plan view of the second example separation system;

FIG. 5 is a partial section view of a processing system of the second example separation system;

FIG. 20 is a somewhat schematic side elevation view of a separation system of the present invention.

DETAILED DESCRIPTION

The present invention relates to the removal of heavier than water particulate from a slurry of waste material the exact composition of which is unknown. The present invention is of particular significance in the context of the removal of sand from a slurry of waste material obtained from a dairy facility.

The present invention may be embodied in a number of different forms. In one basic form, the principles of the present invention may be implemented as a standalone separation system. The principles of the present invention may also be applied to a separation system used as either a first state or a second stage in a larger two-stage separation system further comprising another separation stage.

Accordingly, a number of example implementations of a separation system of the present invention will be described in the following discussion.

I. Example Standalone (Single Stage) Separation System

Figure 1:
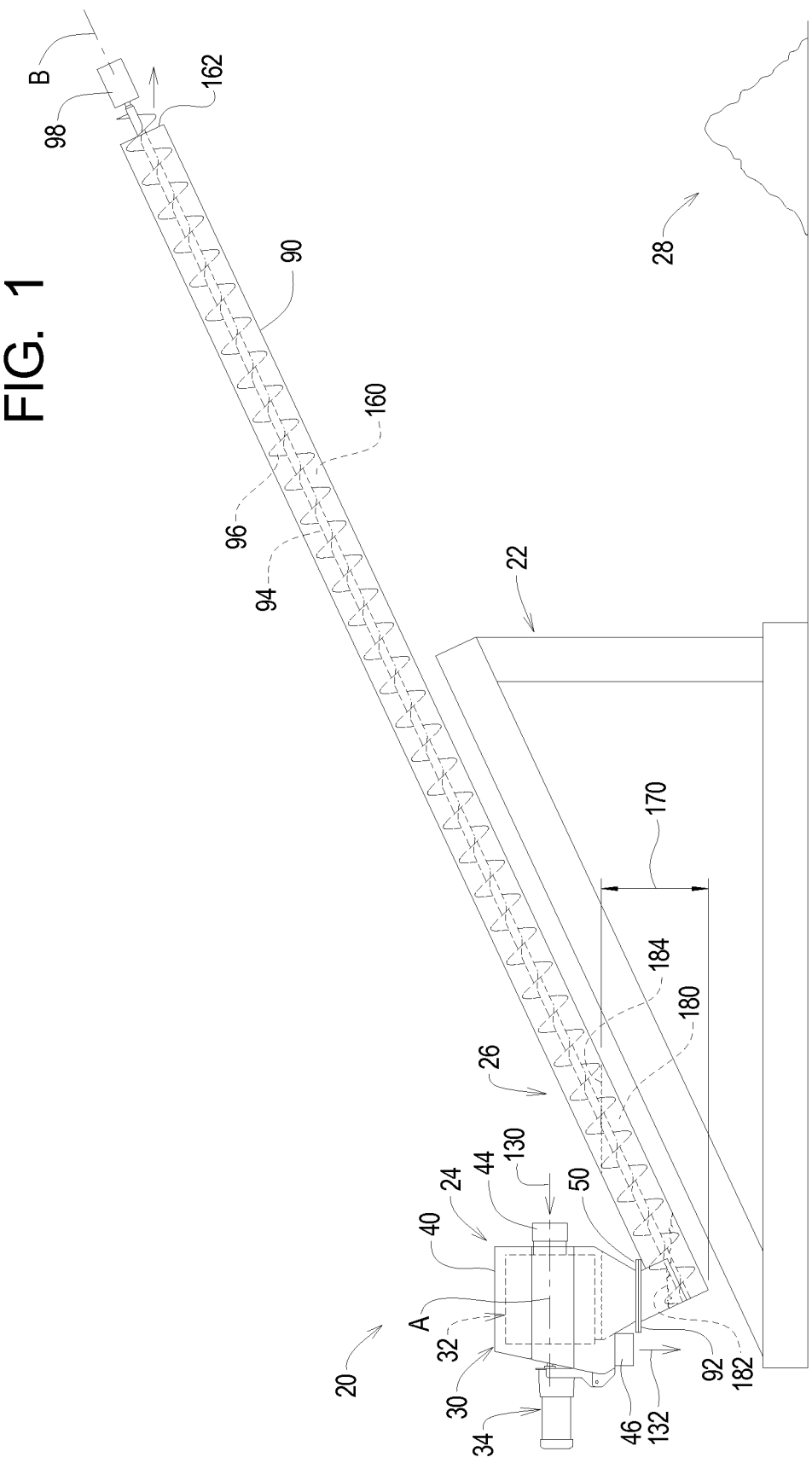
FIG. 1 is a side elevation view of a first example separation system of the present invention.
Figure 2:
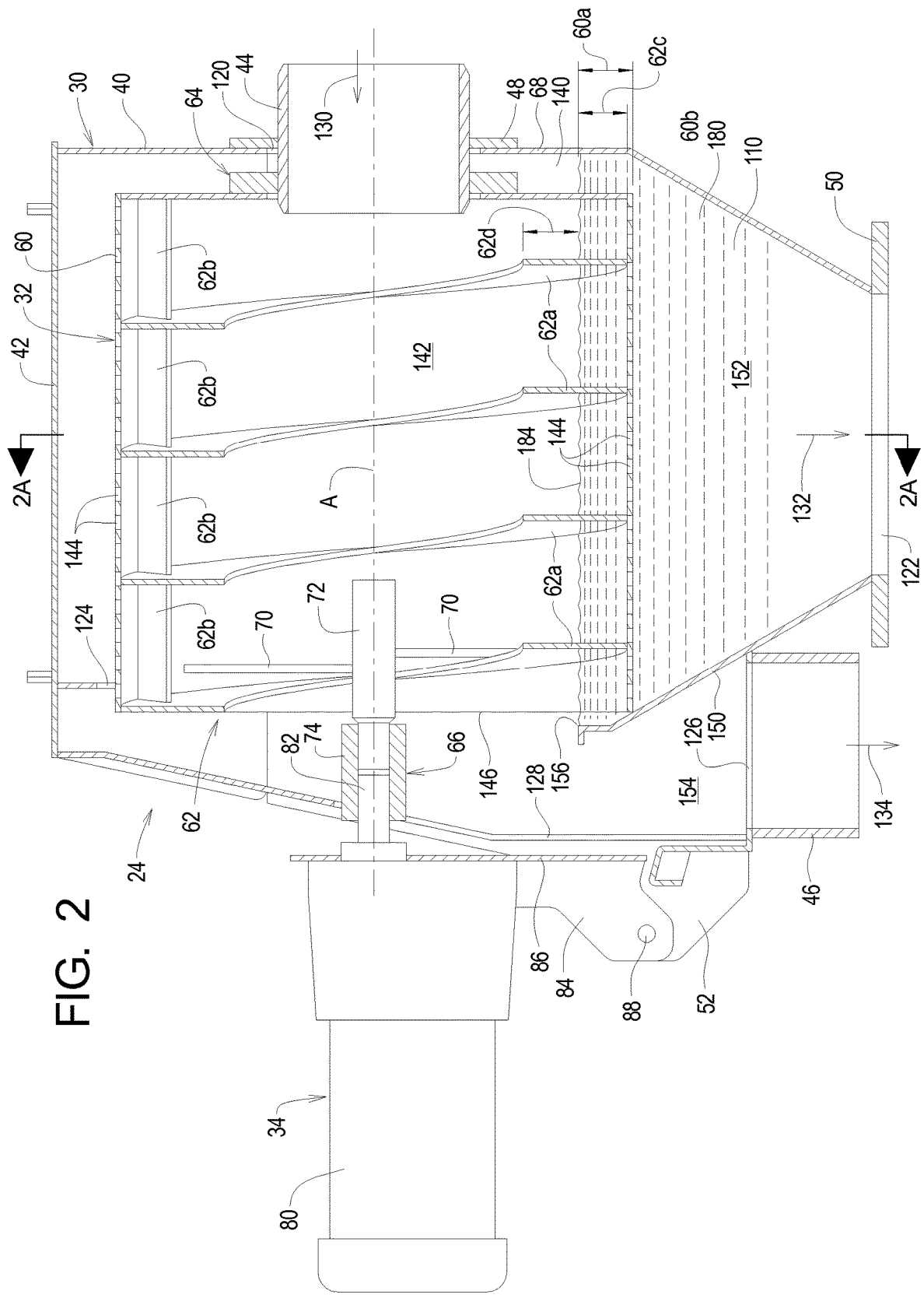
FIG. 2 is a detailed section view of a first separator assembly of the first example separation system.
Figure 2A:
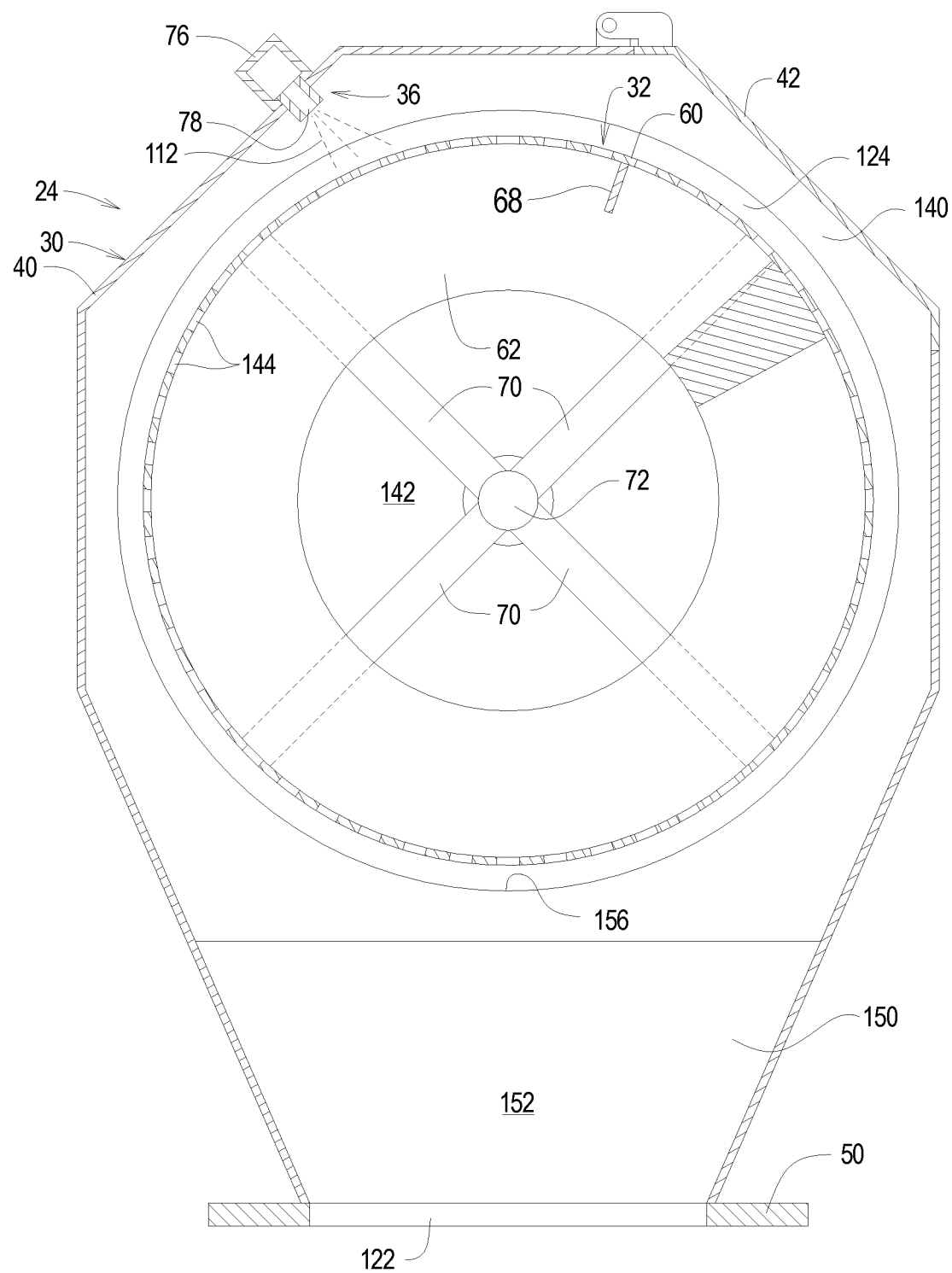
FIG. 2A is a section view taken along lines 2A-2A in FIG. 2.

Referring initially to FIGS. 1 and 2 of the drawing, depicted therein is a first example separation system 20 of the present invention. The first example separation system 20 comprises a support frame 22, a first separator assembly 24, and a second separator assembly 26. A desired location 28 is defined by the second separator assembly 26 as will be described in detail below.

The first separator assembly 24 comprises a housing assembly 30, a drum assembly 32, a drum drive system 34, and a rinse system 36. The housing assembly 30 comprises a main housing 40, a housing cover 42, an inlet pipe 44, and outlet pipe 46, and a support plate 48. Formed on the main housing 40 are a first mounting flange 50 and a motor strut 52. The drum assembly 32 comprises a drum member 60, a blade structure 62, a bearing assembly 64, a coupler assembly 66, and an end wall 68. The coupler assembly 64 comprises spoke members 70, a coupler shaft 72, and a coupler member 74. The rinse system 36 comprises a supply (not shown) of rinse liquid such as water and a spray rod 76 defining a plurality of spray openings 78. The drum drive system 34 comprises a drum motor 80 having a drive shaft 82, a pivot plate 84, a mounting plate 86, and a pivot pin 88. The example second separator assembly 26 comprises a barrel member 90 on which is formed a second mounting flange 92, an auger shaft 94, an auger blade 96, and an auger motor 98.

In the following discussion, the material entering the example separator system 20 through the main inlet 130 will be referred to as feed material 110 and water or other liquids sprayed onto the drum member 60 will be referred to as rinse material 112.

With particular reference to FIG. 2 of the drawing, it can be seen that the first separator assembly 24 is formed as follows. The housing assembly 30 defines an inlet opening 120, a drain opening 122, an interior opening 124, an outlet opening 126, and a drive opening 128. The support plate 48 supports the inlet pipe 44 relative to the inlet opening 120 to define a main inlet 130. At least a portion of a slurry material processed by the example separator system 20 will enter the system 20 through the main inlet 130. The feed material 110 enters the example separator system 20 through the main inlet 130. The drain opening 122 defines a drain outlet 132, and the first mounting flange 50 extends around the drain opening 122. The outlet pipe 46 is supported relative to the outlet opening 126 to define a main or first outlet 134.

The example drum member 60 is formed of a sheet of flat material rolled into a cylinder defining two open ends. The end wall 68 is secured to one of the open ends of the cylindrical drum member 60. FIG. 2 also shows that the bearing assembly 64 and the coupler assembly 66 support the drum member 60 for rotation within the housing assembly 30 about a drum axis A. In particular, the bearing assembly 64 is connected between the drum member 60 and the inlet pipe 44. The spoke members 70 of the coupler assembly 66 are rigidly attached at one end to the drum member 60 and at a second end to the coupler shaft 72 such that the coupler shaft 72 is substantially aligned with the drum axis A.

When the drum motor 80 is in an operational position as shown in FIG. 2, the drive shaft 82 is also aligned with drum axis A. With the drive drum motor 80 in the operational position, the coupler member 74 is arranged to extend between and couple the coupler shaft 72 to the drive shaft 82 such that the drive shaft 82 supports the drum member 60 and rotation of the drive shaft 82 is transmitted to the drum member 60 through the coupler member 74, coupler shaft 72, and spoke members 70. Operation of the drive drum motor 80 thus causes axial rotation of the drum member 60 about the drum axis A.

The example housing assembly 30 defines a housing chamber 140, and the example drum member 60 defines a drum chamber 142. The inlet pipe 44 supports the drum member 60 such that the drum member extends through the interior opening 124 and such that the main inlet 130 bypasses the housing chamber 140. Feed material 110 entering the first example separation system 20 through the inlet pipe 44 thus first enters the drum chamber 142. As shown in FIG. 2, the drum member 60 defines perforations 144 that allow at least a portion of the material within the drum chamber 142 to enter the housing chamber 140. In addition, the open end of the drum member 60 opposite the end wall 68 and the main inlet 130 is uncovered such that the drum member 60 further defines a drum opening 146. The drum opening 146 also allows at least a portion of the feed material 110 within the drum chamber 142 to enter the housing chamber 140.

FIG. 2 further shows that the main housing 40 further comprises a weir wall 150 that divides the housing chamber 140 below the drum member 60 into an auger hopper portion 152 and an outlet portion 154. In particular, the auger hopper portion 152 is arranged below the drum member 60 such that material flowing or dropping through the perforations 144 goes into the auger hopper portion 152. It should be noted that the perforations 144 are formed at regularly spaced locations over the entire surface of the drum member 60. In FIG. 2, however, the perforations 144 are only depicted at the top and bottom where the drum member 60 is shown in section view to avoid cluttering that drawing figure.

The outlet portion 154 is arranged below the drum opening 146 such that material flowing or dropping through the drum opening 146 goes into the outlet portion 154. The output portion 154 is arranged above the outlet pipe 46 to allow material within the output portion 154 to flow through the main outlet 134. The weir wall 150 defines a weir edge 156. The weir edge 156 of the weir wall 150 is located and shaped to allow material within the drain basin portion 152 to enter the outlet portion 154 as will be described in further detail below.

The example blade structure 62 comprises one or more blades 62a and one or more lifting plates 62b. The example blades 62a are helical and radially extend inwardly from the drum member 60 into the drum chamber 142 and towards the drum axis A. The example lifting plates 62b also radially extend inwardly from the drum member 60 into the drum chamber 142 and towards the drum axis A. However, the lifting plates 62b are substantially aligned with the drum axis A and extend between adjacent blades 62a of the blade structure 62 as perhaps best shown in FIG. 2. The example blade or blades 62a extend approximately 40% of the distance between the drum member 60 and the drum axis A. The example lifting plates 62b extend approximately 15% of the distance between the drum member 60 and the drum axis A. As will be explained in further detail below, the blade structure 62 and the lifting plates 62b are configured to displace solids within the drum chamber 142 from the main inlet 130 to the drum opening 146. The dimensions and shapes of blades 62a and the lifting plates 62b of the blade structure 62 may be determined based on the specific environment (composition of the feed material, flow rates, etc.) in which the first example separation system 20 is intended to operate.

In use as shown in FIG. 1, the first and second mounting flanges 50 and 92 are connected together using bolts, welding, or the like. The connection between the first and second mounting flanges 50 and 92 is desirably fluid tight. The example main housing 40 and barrel member 90 are configured such that, during normal use of the first example separation system 20, the drum axis A is desirably substantially horizontal, and the auger axis B extends at an angle with respect to the drum axis A.

FIG. 1 further illustrates that the barrel member 90 defines a barrel chamber 160. An upper end of the barrel member 90 is open to define an auger or second outlet 162 of the first example separation system 20. The length of the barrel member 90 and the angle between the drum axis A and the auger axis B are determined such that the second outlet 162 is arranged above the desired location 28. Where the first and second separator assemblies 24 and 26 are connected by the first and second flanges 50 and 92, the barrel chamber 160 and the drain basin portion 152 of the housing chamber 140 define an auger hopper 170 of the first example separation system 20. FIG. 1 also illustrates that the angle between the drum axis A and the auger axis B allows liquid 180 and sand 182 to collect in the auger hopper 170. The vertical location of the weir edge 156 of the weir wall 150 determines a level 184 of the liquid within the auger hopper 170.

In addition, as shown in FIG. 2 the housing assembly 30 supports the drum assembly 32 such that a submerged portion 60a of the drum member 60 is below the liquid level 184 defined by the auger hopper 170. FIG. 2 illustrates that, in the first example separator assembly 24, the liquid level 184 is arranged such that the liquid within the auger hopper 170 extends from a bottom most portion 60b of the drum member 60 approximately half-way up a radial dimension of the blade or blades 62a forming the blade structure 62. The weir edge 156 is desirably arranged such at most only a submerged portion 62c of the blade or blades 62a is below the liquid level 184. A non-submerged portion 62d of the blade or blades 62a remains above the liquid level 184 such that the blade or blades 62a may act on a floating portion of the feed material 110 as will be described in further detail below.

The first example separation system 20 operates as follows. Feed material 110 is introduced into the main inlet 130. In the context of a dairy facility, the feed material 110 will typically comprise a mixture or combination of rinse liquids, liquid and solid animal waste, fiber material such as corn, and sand. The physical structures of larger fibers particles, such as solid animal waste and feed, are typically larger and less dense than the particles of sand.

The feed material 110 flowing through the main inlet 130 will be deposited on the inner surface of the drum member 60 within the drum chamber 142. Then drum member 60 is then rotated by the drum drive system 34, agitating the feed material 110 within the drum chamber 142. At the same time, the rinse material 112 is sprayed through the spray openings 78 onto the outer surface of the drum such that the rinse material 112 flows through the perforations 144 and onto the feed material 110 within the drum chamber 142. When the feed material 110 is agitated and rinsed, the smaller sand particles will typically be suspended in the rinse liquid 112 and in the liquid portion of the feed material 110.

The perforations 144 are sized and dimensioned to prevent larger particles, such as fiber material and solid animal waste, from flowing from the drum chamber 142 into the drain basin portion 152 of the housing chamber 140 and thus into the auger hopper 170. However, liquids and heavier and smaller particles, such as sand, suspended in the liquids will pass through the perforations 144 and be carried by the liquids into the auger hopper 170. In addition, a relatively small amount of the relatively lighter smaller solids may pass through the perforations and into the auger hopper 170.

Rotation of the drum member 60 encourages the liquid portion of the feed material 110, relatively heavy particulates sand suspended in the liquid portion, and possibly some of the relatively smaller, lighter particulates such as fiber in the feed material 110 to flow through the perforations 144 and into the auger hopper 170. With rotation of the drum member 60, the blade structure 62 will displace the portion of the feed material 110 that has not passed through the perforations 144 out of the drum chamber 142 through the drum opening 146 and into the output portion 154 of the housing chamber 140. Any material flowing into the output portion 154 of the housing chamber 140 will flow through the main outlet 134 defined by the first example separation system 20. In practice, the blade structure 62 will displace the larger particles, such as fiber material and animal waste, through the drum opening 146 and subsequently through the main outlet 134.

Liquids 180, relatively heavy particulates such as sand 182, and possibly some of the relatively lighter particulates that pass through the perforations 144 will collect in the auger hopper 170. Eventually, the level 184 of the liquids 180 in the auger hopper 170 will reach the weir edge 156 of the weir wall 150. At this point, the liquids 180 will flow over the weir edge 156 from the auger hopper 170 into the outlet portion 154 and out of the first example separation system 20 through the main outlet 134.

Further, as shown in FIG. 2, the example weir edge 156 is set such that the level 184 of the liquids 180 in the drain basin portion 152 is above a lowermost portion of the drum assembly 32. At least a portion of each of the solids and sand carried along by the blades 62a is thus below the liquid level 184. The solids and sand are thus agitated by the blades 62a below the surface of liquids 180 within the drain basis portion 152, thus facilitating separation of the sand and solids such that the solids may be displaces along the inside of the drum assembly 32 and out of the drum opening while the sand exits the drum assembly 32 through the perforations 144.

However, the liquid 180 within the auger hopper 170 below the liquid level 184 is relatively still (e.g, no or low agitation). Accordingly, sand 182 suspended within the liquid 180 after passing through the perforations 144 will collect or settle at the bottom of the auger hopper 170 as shown in FIG. 1. At the same time, any relatively light, smaller particulates that passed through the perforations 144 will float to the top of the liquid 180 in the auger hopper 170 and will eventually also be carried over the weir edge 156, into the outlet portion 154, and through the main outlet 134.

Operation of the auger drive motor 98 causes rotation of the auger shaft 94. The auger blade 96 is a helical member that extends radially from the auger shaft 94. As the auger shaft 94 rotates, the auger blade 96 will displace the sand 182 within the auger hopper 170 up along the barrel chamber 160 and out of the second outlet 162 of the first example sand separation system 20. The auger blade 96 is typically rotated at a low speed to discourage agitation of the liquid 180 and sand 182 in the auger hopper 170 that might otherwise cause the sand 182 to become suspended within the liquid 180.

The drum motor 80 and the auger motor 98 may be operated together or independently. Either of these motors 80 and 98 may be operated continuously, periodically, asynchronously, and/or at irregular intervals. Further, a control system comprising one or more sensors may be provided. The sensors can be configured to generate signals indicative of fluid levels, solids levels, weight levels, or the like, and the control system can operate one or both of the motors 80 and/or 98 based on these signals.

In the first example separation system 20, the drum 60 containing the perforations 144 is formed by standard perforated sheets of sufficiently rigid metal to allow the sheets to be rolled and welded to form the cylindrical drum 60 as shown in FIG. 2. The sizes of the perforations 144 and diameter of the cylindrical drum member 60 will be determined based on the expected composition and flow rate of the feed material 110 and any rinse material 112 entering the drum chamber 142. Using standard sheets of perforated steel, the perforations 144 may be formed by $\frac{1}{16}$ inch or $\frac{3}{16}$ inch circular openings at standard spacings. The perforation may in any event be within a first range of $\frac{1}{16}$ inch and $\frac{3}{16}$ inch or within a second range of approximately $\frac{1}{32}$ inch to $\frac{1}{2}$ inch.

The rotational speed of the drum member 60 will also be determined by the composition and flow rate of the feed material 110 through the main inlet 130. In the first example separation system 20, the drum member 60 is rotated at a drum rotation speed of approximately 20 rpm. The drum rotation speed is typically within a first range of approximately 15 to 25 rpm and in any event should be within a second range of approximately 5 to 35 rpm.

The exact angle between the drum axis A and the auger axis B is not critical, but is approximately 27.5 degrees in the example shown in FIG. 1. This angle is typically in a first range of approximately 20 to 40 degrees and in any event may be within a second range of approximately 5 to 80 degrees.

II. Example Two-Stage Separation System

Turning now to FIGS. 3, 4, 4A, and 5, depicted at 220 therein is a second example separation system 220 constructed in accordance with, and embodying, the principles of the present invention. The second example separation system 220 comprises a support frame 222 that supports a first stage or primary separator 224 and a second stage or secondary separator 226.

The example first stage or primary separator 224 is disclosed in the Applicant's copending U.S. patent application Ser. Nos. 13/351,214 and 13/926,640, which are attached hereto as Exhibits A and B and incorporated herein by reference. The example second stage or secondary separator 226 is the first example separation system 20 described above. The first and second stage separators 224 and 226 will be described again herein only to that extent necessary for a complete understanding of the principles of the present invention.

The first stage separator 224 comprises a primary processing system 230, a trough system 232, and a drive system 234. As perhaps best shown in FIGS. 4, 4A, and 5, the primary processing system 230 defines a primary inlet 240, a first primary outlet 242, and a second primary outlet 244. The primary inlet 240 is arranged such that, when the primary processing system 230 is rotated by the drive system 234, a processed portion of primary feed material contained in the trough system 232 is displaced from the primary inlet 240 towards the first primary outlet 242. In practice, relatively clean sand exits the primary processing system 230 through the first primary outlet 242.

Figure 4A:
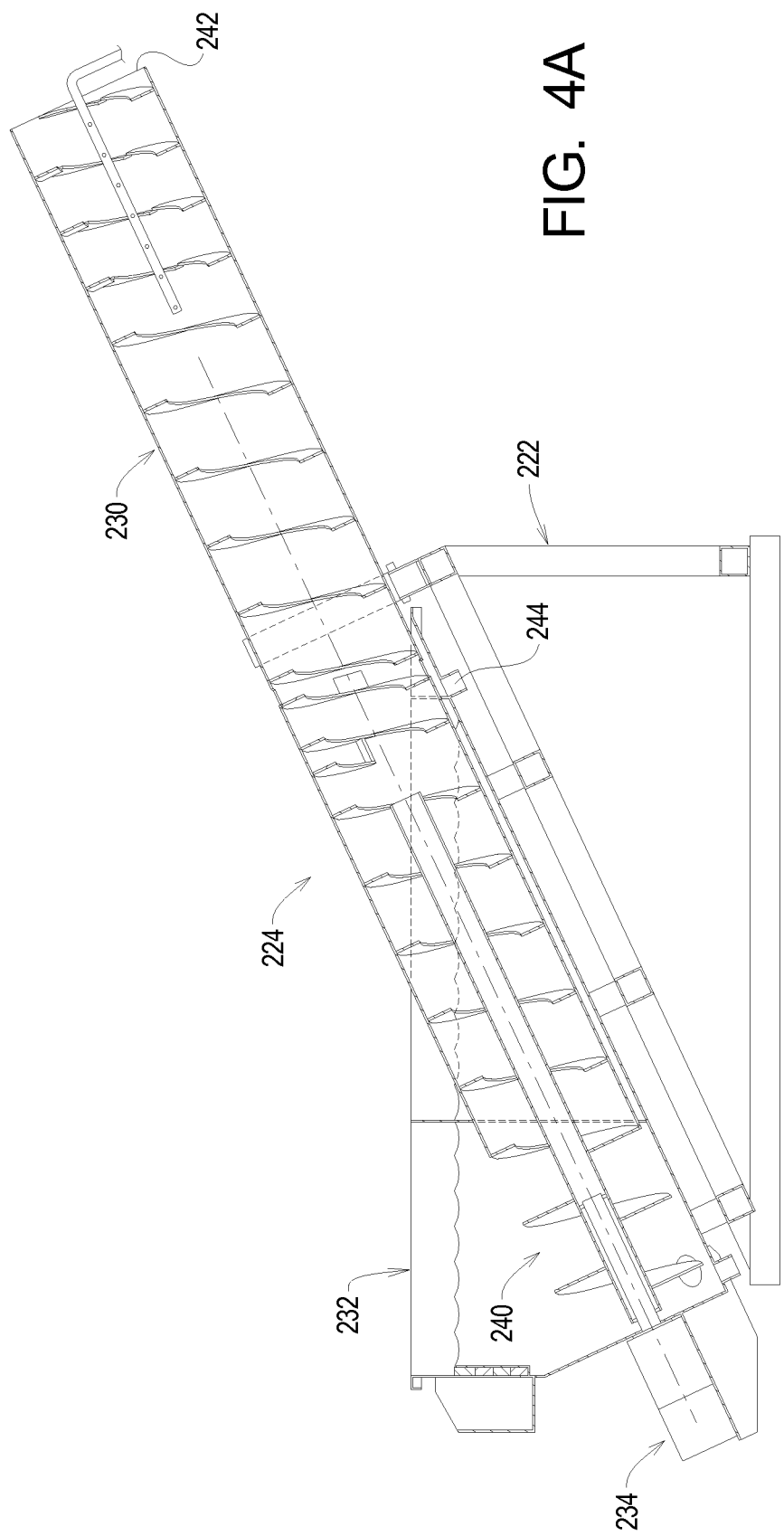
FIG. 4A is a section view taken along lines 4A-4A in FIG. 4.

As perhaps best shown in FIGS. 4A and 5, the second primary outlet 244 is arranged between the primary inlet 240 and the first primary outlet 242 such that a portion of the feed material processed by the first stage separator 224 flows out of the second primary outlet 244. In particular, when the primary feed material in the trough system 232 is obtained from a dairy facility, the primary feed material will comprise solid and liquid animal waste, contaminates such as fiber material, sand, and rinse water. Additional rinse water may be added to the primary feed material.

In the '214 and '640 applications, the Applicants noted that the second primary outlet 244 can be arranged to remove a portion of the primary feed material. The '214 application specifically noted that the primary processing system 230 and the second primary outlet 244 can be configured to prevent lighter particulates from flowing with rinse water back towards the trough system 232. More specifically, rinse water introduced in the primary processing system 230 tended to carry lighter particulate material, especially fiber material such as corn, back into the trough system 232. This lighter particulate material would float in the trough system 232, clogging the trough system 232 and reducing the effectiveness of the primary processing system 230. Removing such lighter particulate material from the primary processing system 230 through the second primary outlet 244 before these lighter particulate materials can flow back into the trough system 232, as generally shown in FIGS. 4, 4A, and 5, can alleviate clogging of the trough system 232 and thereby increase the effectiveness of the primary processing system 230.

However, the portion of the primary feed material removed through the second primary outlet 244 can also carry sand. In particular, the primary feed material being processed by the primary processing system 230 is agitated by rotation of the primary processing system 230, and smaller, lighter sand particles can become suspended in the liquids in the primary feed material and rinse water. These suspended sand particles can flow with the lighter particulate material and liquids out of the second primary outlet 244 instead of being carried up to the first primary outlet 242. The portion of the processed material removed from the primary processing system 230 through the second primary outlet will be referred to as the secondary feed material.

The secondary feed material will typically differ from the primary feed material in the relative concentration of relatively lighter particulates, such as fiber material, to relatively heavier particulates, such as sand. In particular, the secondary feed material will typically contain a much lower percentage of relatively heavier particulates and a much higher percentage of relatively lighter particulates than the primary feed material.

FIG. 4 illustrates that the second example separation system 220 comprises a transfer conduit 250 connected between the second primary outlet 244 and a secondary inlet 252 defined by the second stage separator 226. The secondary inlet 252 may be the same as the main inlet 130 of the first example separation system 20 described above. The secondary feed material will thus be processed in the same manner as the feed material processed by the first example separation system 20 to remove sand from the secondary feed material. The second stage separator 226 efficiently separates the secondary feed material into the heavier, smaller particulates (e.g., sand) and larger, lighter fiber particulates (e.g., corn). In particular, while the primary or first stage separator 224 is more effective at removing sand from the primary feed material, the second stage separator 226 is more effective at removing sand from the secondary feed material. The combination of the first and second stage separators 224 and 226 is thus highly efficient at removing sand from slurry material obtained from a dairy operation.

III. Example Two-Stage Separation System

Figure 6:
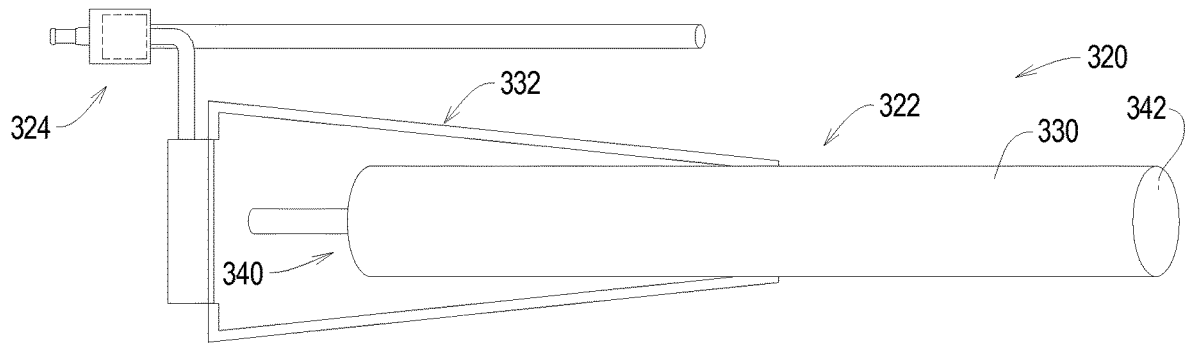
FIG. 6 is a top plan view of a third example separation system of the present invention.

FIG. 6 illustrates a third example separation system 320 comprising a primary or first stage separator 322 and a secondary or second stage separator 324. Again, the example first stage or primary separator 322 is disclosed in the Applicant's copending U.S. patent application Ser. Nos. 13/351,214 and 13/926,640 and the example second stage or secondary separator 324 is the first example separation system 20 described above. The first and second stage separators 324 and 326 will be described again herein only to that extent necessary for a complete understanding of the principles of the present invention.

The first stage separator 322 comprises a processing system 330, a trough system 332, and a drive system (not visible in FIG. 6) and defines a primary inlet 340 and a first primary outlet 342. Again, relatively clean sand exits the processing system 330 through the first primary outlet 342. In the third example separation system 320, a portion of the primary feed material within the trough system 332 is removed and carried by a conduit 350 to a secondary inlet of the secondary or second stage separator 324. The portion of the primary feed material flowing through the conduit 350 will be referred to as secondary feed material and is removed from the top of the trough system 332. Because the secondary feed material is removed from the top of the trough system 332, the secondary feed material will typically contain a much lower percentage of relatively heavier particulates and a much higher percentage of relatively lighter particulates than the primary feed material.

The secondary inlet 352 may be the same as the main inlet 130 of the first example separation system 20 described above. The secondary feed material will thus be processed in the same manner as the feed material processed by the first example separation system 20 to remove sand from the secondary feed material. The second stage separator 324 efficiently separates the secondary feed material into the heavier, smaller particulates (e.g., sand) and larger, lighter particulates (e.g., corn). In particular, while the primary or first stage separator 322 is more effective at removing sand from the primary feed material, the second stage separator 324 is more effective at removing sand from the secondary feed material. The combination of the first and second stage separators 322 and 324 is thus highly efficient at removing sand from slurry material obtained from a dairy operation.

IV. Example Two-Stage Separation System

Figure 7:
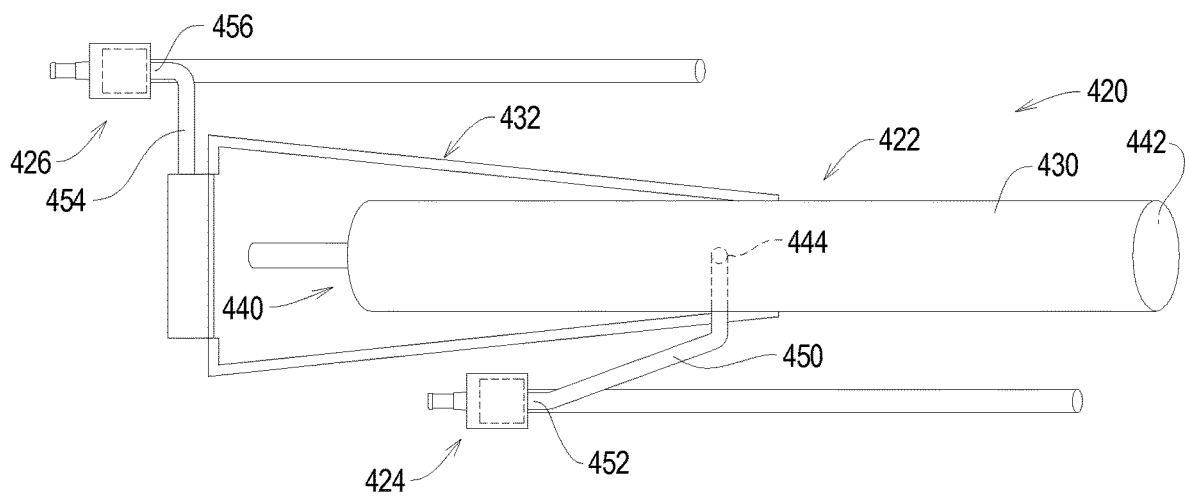
FIG. 7 is a top plan view of a fourth example separation system of the present invention.

FIG. 7 illustrates a fourth example separation system 420 comprising a primary separator 422, a first secondary separator 424, and a second secondary separator 426. The example primary separator 422 is or may be the system disclosed in the Applicant's copending U.S. patent application Ser. Nos. 13/351,214 and 13/926,640. The first and second secondary separators 424 and 426 may be the same as the first example separation system 20 described above. The primary separator 422 and the first and second secondary separators 424 and 426 will be described again herein only to that extent necessary for a complete understanding of the principles of the present invention.

The first stage separator 422 comprises a processing system 430, a trough system 432, and a drive system (not visible in FIG. 7) and defines a primary inlet 440, a first primary outlet 442, and a second primary outlet 444. Relatively clean sand exits the processing system 430 through the first primary outlet 442. A first secondary feed material is removed from the processing system 430 through a first secondary conduit 450 connected between the second primary outlet 444 and a first secondary inlet 452 of the first secondary separator 424. In addition, a second secondary feed material is removed directly from the trough system 432 through a second secondary conduit 454 connected between the trough system 432 and a second secondary inlet 456 of the second secondary separator 426.

The first secondary inlet 452 and the second secondary inlet 456 may be the same as the main inlet 130 of the first example separation system 20 described above. The secondary feed materials will thus be processed by the first and second secondary separators 424 and 426 in the same manner as the feed material processed by the first example separation system 20 to remove sand from the first and second secondary feed materials, respectively. The combination of the primary separator 422 with the first and second secondary separators 424 and 426 is thus highly efficient at removing sand from slurry material obtained from a dairy operation.

V. Example Two-Stage Separation System

Figure 8:
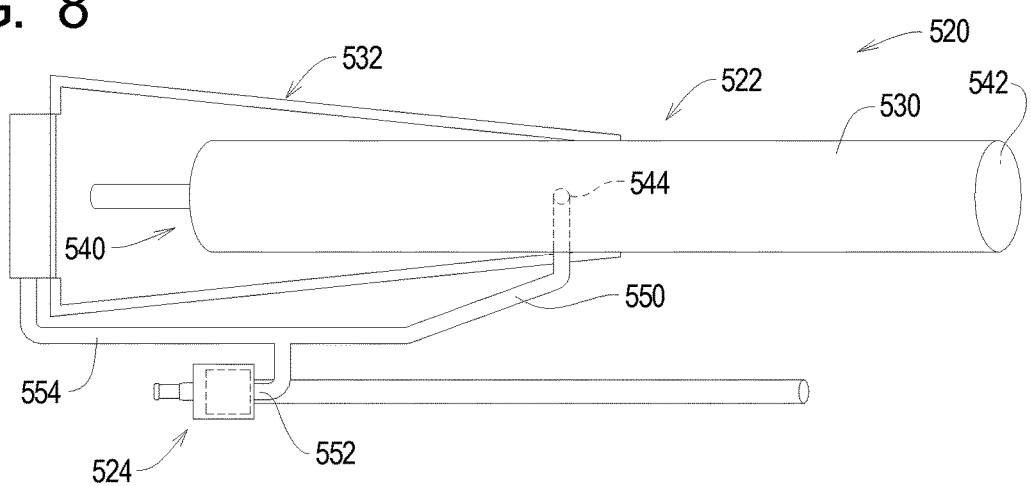
FIG. 8 is a top plan view of a fifth example separation system of the present invention.

FIG. 8 illustrates a fifth example separation system 520 comprising a primary separator 522 and a secondary separator 524. The example primary separator 522 is or may be the system disclosed in the Applicant's copending U.S. patent application Ser. Nos. 13/351,214 and 13/926,640. The secondary separator 524 may be the same as the first example separation system 20 described above. The primary separator 522 and the secondary separator 524 will be described again herein only to that extent necessary for a complete understanding of the principles of the present invention.

The first stage separator 522 comprises a processing system 530, a trough system 532, and a drive system (not visible in FIG. 8) and defines a primary inlet 540, a first primary outlet 542, and a second primary outlet 544. Relatively clean sand exits the processing system 530 through the first primary outlet 542. A first secondary feed material is removed from the processing system 530 through a first secondary conduit 550 connected between the second primary outlet 544 and a secondary inlet 552 of the second stage separator 524. In addition, a second secondary feed material is removed from the processing system 530 through a second secondary conduit 554 connected between the trough system 532 and the secondary inlet 552.

The first secondary inlet 552 may be the same as the main inlet 130 of the first example separation system 20 described above. Accordingly, the secondary feed material will thus be processed in the same manner as the feed material processed by the first example separation system 20 to remove sand from the secondary feed material. The combination of the primary separator 522 with the secondary separator 524 is thus highly efficient at removing sand from slurry material obtained from a dairy operation.

VI. Example Two-Stage Separation System

Figure 9:
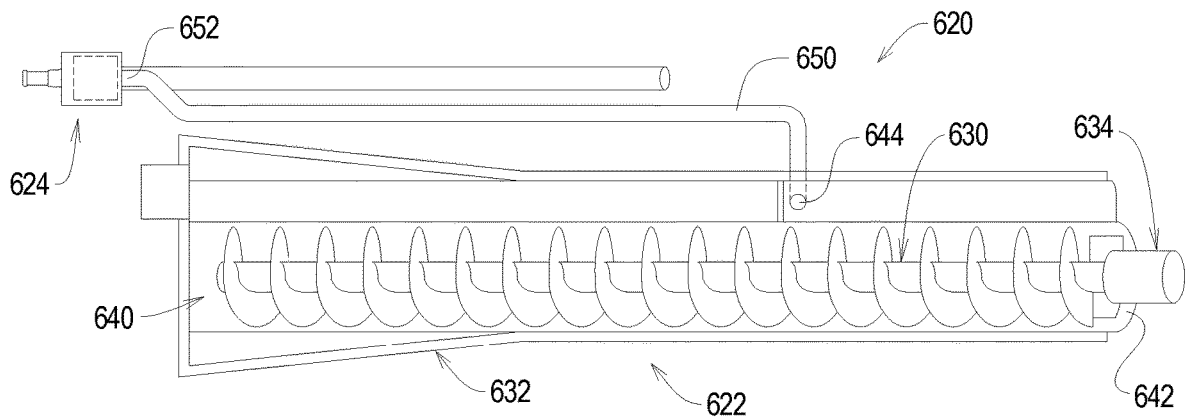
FIG. 9 is a top plan view of a sixth example separation system of the present invention.

FIG. 9 illustrates a sixth example separation system 620 comprising a primary or first stage separator 622 and a secondary or second stage separator 624. In the sixth example separation system 620, the example first stage or primary separator 622 is a modified version of a sand separator for a dairy facility sold by McLanahan Corporation of Hollidaysburg, Pa. and generally disclosed in U.S. Pat. No. 5,950,839 to Wedel. The example second stage or secondary separator 624 is the first example separation system 20 described above. The first and second stage separators 622 and 624 will be described again herein only to that extent necessary for a complete understanding of the principles of the present invention.

The first stage separator 622 comprises a processing system 630, a trough system 632, and a drive system 634 and defines a primary inlet 640, a first primary outlet 642, and a second primary outlet 644. Again, relatively clean sand exits the processing system 630 through the first primary outlet 642. In the sixth example separation system 620, a secondary feed material is carried from the primary separator 622 to the secondary separator 624 by a first conduit 650 connected between the second primary outlet 644 and a secondary inlet 652 of the secondary separator 624.

The secondary inlet 652 may be the same as the main inlet 130 of the first example separation system 20 described above. The secondary feed material will thus be processed in the same manner as the feed material processed by the first example separation system 20 to remove sand from the secondary feed material. The combination of the primary and secondary separators 622 and 624 is thus efficient at removing sand from slurry material obtained from a dairy operation.

VII. Example Two-Stage Separation System

Figure 10:
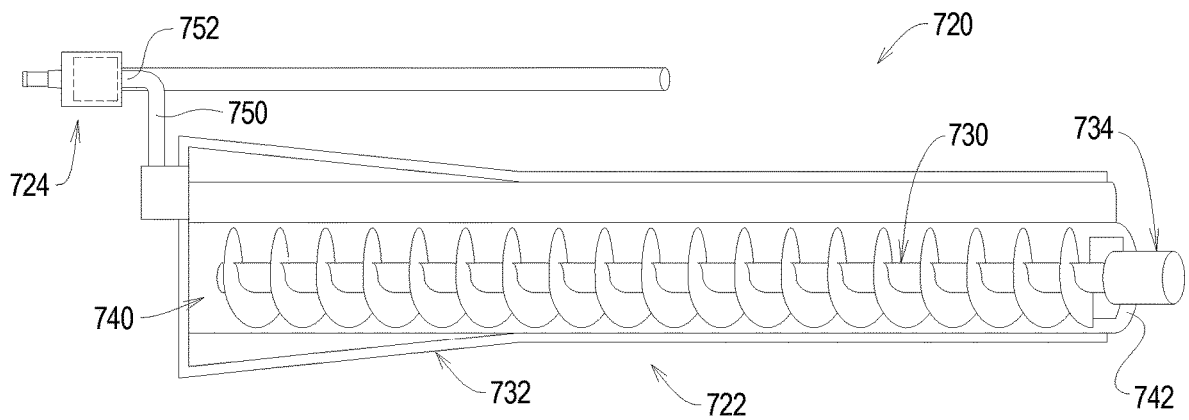
FIG. 10 is a top plan view of a seventh example separation system of the present invention.

FIG. 10 illustrates a seventh example separation system 720 comprising a primary or first stage separator 722 and a secondary or second stage separator 724. Again, the example first stage or primary separator 722 is a modified version of a sand separator for a dairy facility sold by McLanahan Corporation of Hollidaysburg, Pa. and generally disclosed in U.S. Pat. No. 5,950,839 to Wedel. The example second stage or secondary separator 724 is the first example separation system 20 described above. The first and second stage separators 722 and 724 will be described again herein only to that extent necessary for a complete understanding of the principles of the present invention.

The first stage separator 722 comprises a processing system 730, a trough system 732, and a drive system 734 and defines a primary inlet 740 and a first primary outlet 742. Again, relatively clean sand exits the processing system 730 through the first primary outlet 742. A secondary feed material is carried from the primary separator 722 to the secondary separator 724 by a first conduit 750 connected between the trough system 732 and a secondary inlet 752 of the secondary separator 724.

The secondary inlet 752 may be the same as the main inlet 130 of the first example separation system 20 described above. The secondary feed material will thus be processed in the same manner as the feed material processed by the first example separation system 20 to remove sand from the secondary feed material. The combination of the primary and secondary separators 722 and 724 is thus efficient at removing sand from slurry material obtained from a dairy operation.

VIII. Example Two-Stage Separation System

Figure 11:
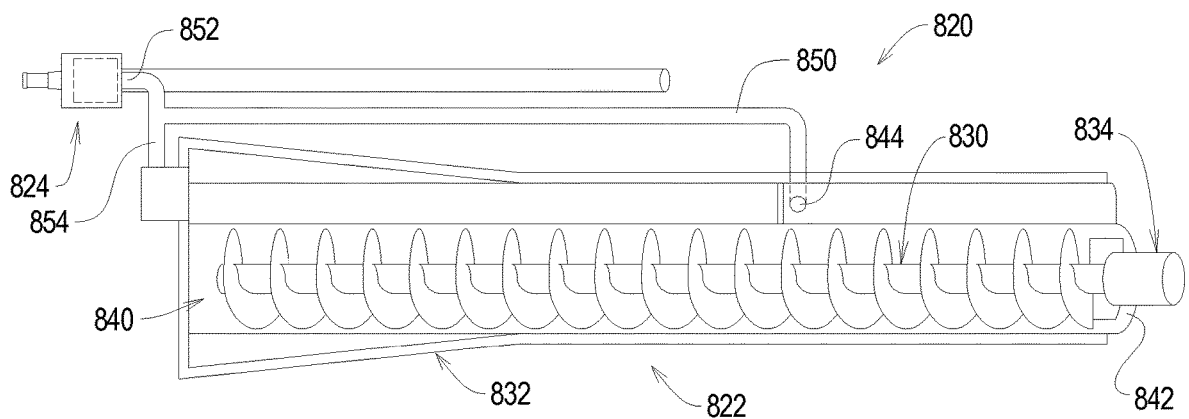
FIG. 11 is a top plan view of an eighth example separation system of the present invention.

FIG. 11 illustrates an eighth example separation system 820 comprising a primary or first stage separator 822 and a secondary or second stage separator 824. In the eighth example separation system 820, the example first stage or primary separator 822 is a modified version of a sand separator for a dairy facility sold by McLanahan Corporation of Hollidaysburg, Pa. and generally disclosed in U.S. Pat. No. 5,950,839 to Wedel. The example second stage or secondary separator 824 is the first example separation system 20 described above. The first and second stage separators 822 and 824 will be described again herein only to that extent necessary for a complete understanding of the principles of the present invention.

The first stage separator 822 comprises a processing system 830, a trough system 832, and a drive system 834 and defines a primary inlet 840, a first primary outlet 842, and a second primary outlet 844. Again, relatively clean sand exits the processing system 830 through the first primary outlet 842. In the eighth example separation system 820, a first secondary feed material is carried from the primary separator 822 to the secondary separator 824 by a first conduit 850 connected between the second primary outlet 844 and a secondary inlet 852 of the secondary separator 824. In addition, a second secondary feed material is carried from the primary separator 822 to the secondary separator 824 by a second conduit 854 connected between the trough system 832 and the secondary inlet 852 of the secondary separator 824.

The secondary inlet 852 may be the same as the main inlet 130 of the first example separation system 20 described above. The secondary feed material will thus be processed in the same manner as the feed material processed by the first example separation system 20 to remove sand from the secondary feed material. The combination of the primary and secondary separators 822 and 824 is thus efficient at removing sand from slurry material obtained from a dairy operation.

The eighth example separator system may be modified by using a second secondary separator. If first and second secondary separators are provided, the inlet 852 of the first secondary separator 824 is connected to the first conduit 850, and the inlet of the second secondary separator is connected to the second conduit 854.

IX. Example Two-Stage Separation System

Figure 12:
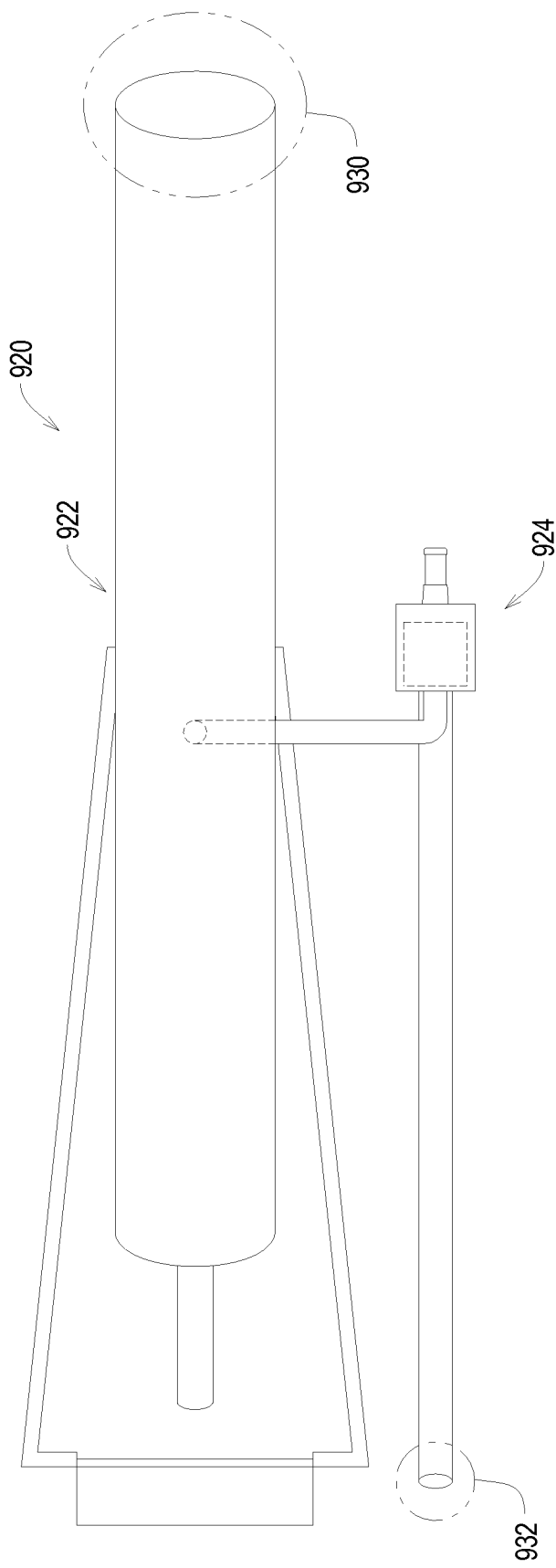
FIG. 12 is a side elevation cutaway view of a separation system of the present invention.

FIG. 12 illustrates a ninth example separation system 920 comprising a primary or first stage separator 922 and a secondary or second stage separator 924. Except as described below, the ninth example separation system 920 is or may be similar to the second example separation system 220 described above. The ninth example separation system 920 will be described only to that extent that it differs from the second example separation system 220.

In the ninth example separation system 920, the primary separator 922 is configure to deposit material at a first location 930, while the secondary separator 924 is configured to deposit material at a second location 932 spaced from the first location 930. The configuration of the ninth example separation system 920 as depicted in FIG. 12 thus allows segregation of material exiting the primary separator 922 from the material exiting the secondary separator 924. This segregation allows the materials exiting the first and second separators 922 and 924, which may have different compositions, to be treated differently during further processing.

X. Example Single-Stage Separation System

Figure 13:
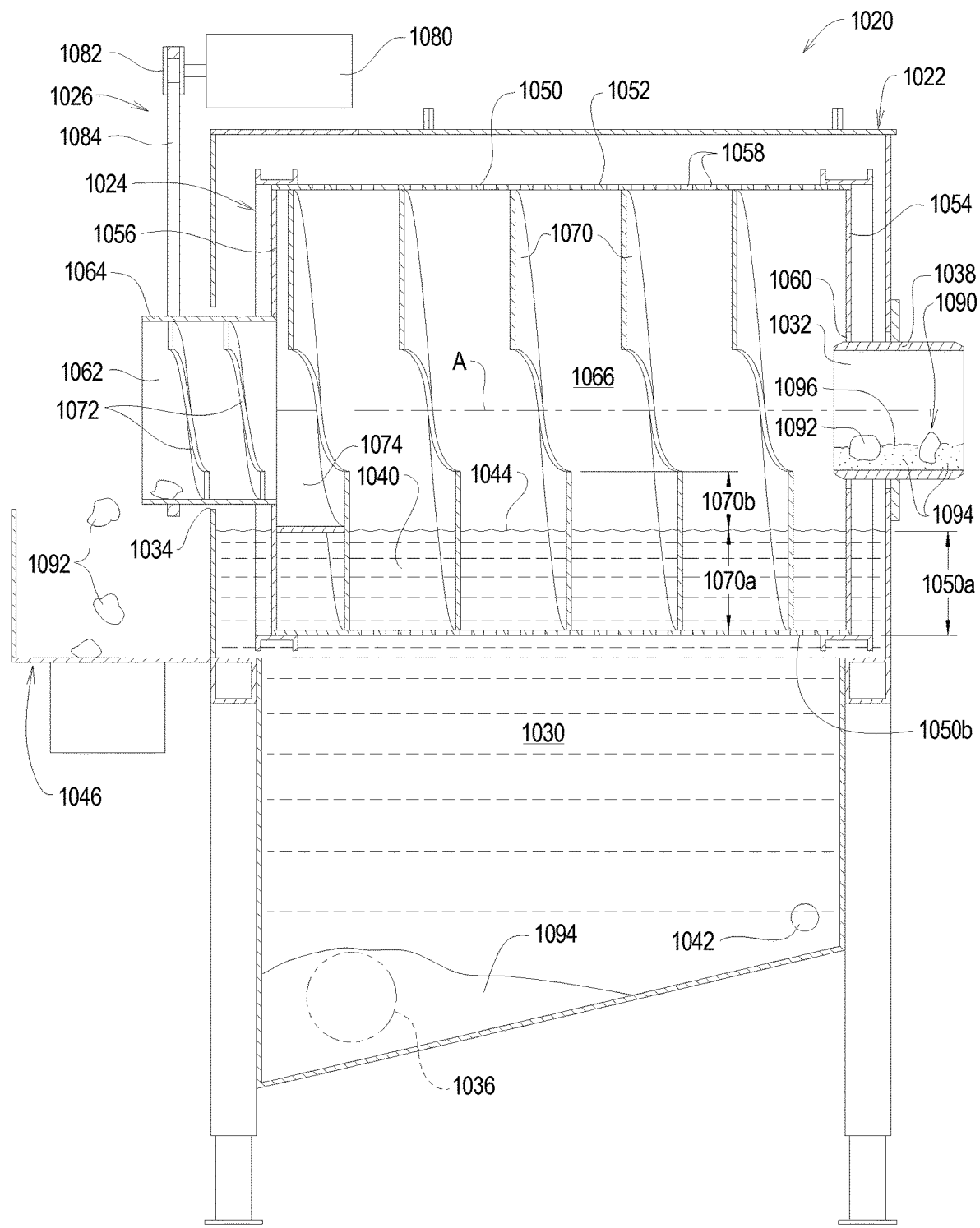
FIG. 13 is an a side, partial cutaway view of the separation system of FIG. 14.
Figure 14:
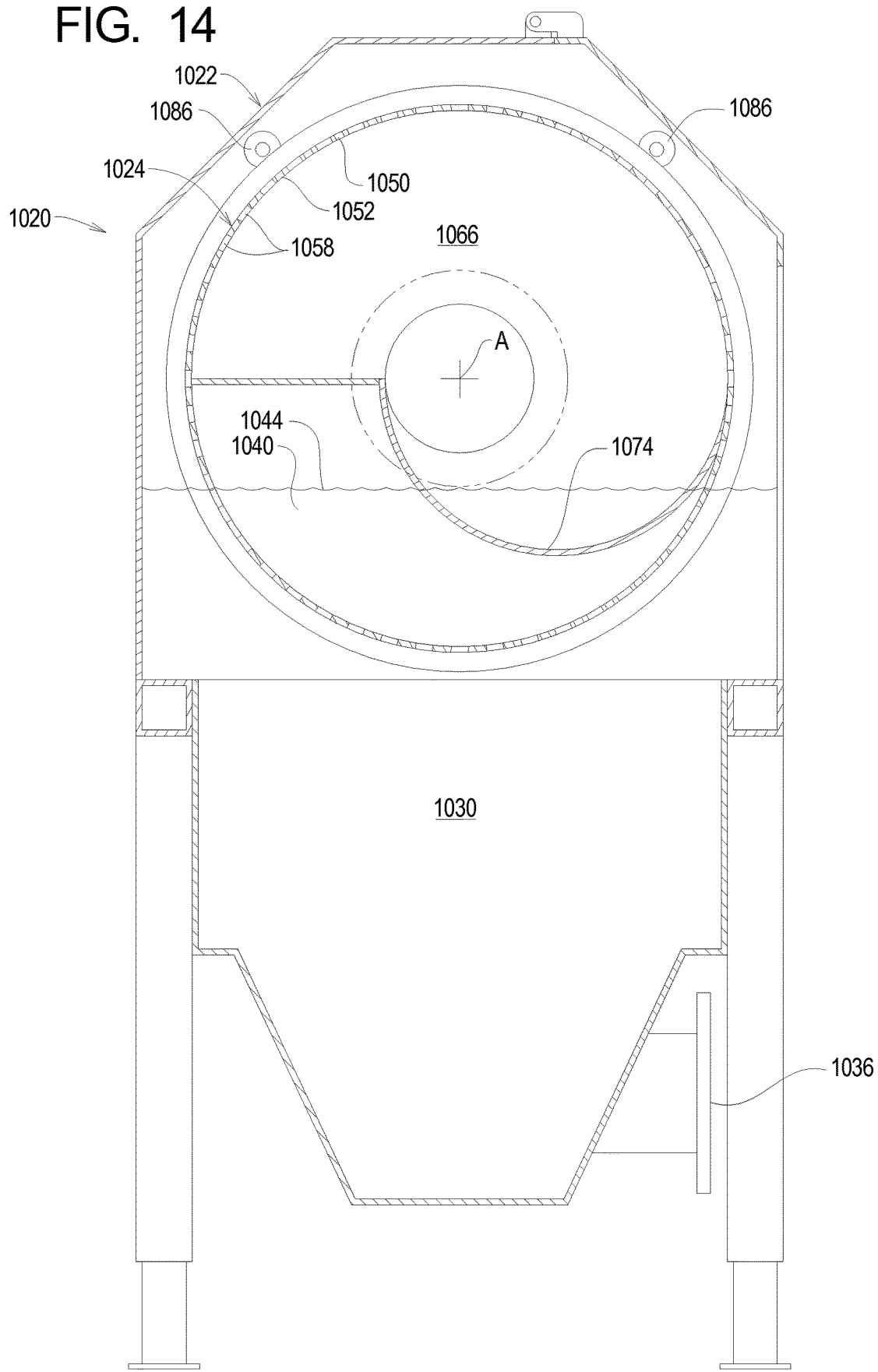
FIG. 14 is a vertical section view of the separation system of FIG. 14 perpendicular to the longitudinal axis A.

Referring now to FIGS. 13 and 14 of the drawing, depicted therein is another example separation system 1020 constructed in accordance with the principles of the present invention. The example separation system 1020 comprises a housing assembly 1022, a drum assembly 1024, and a drive system 1026.

The example housing assembly 1022 defines a collection chamber 1030, a housing inlet 1032, a housing outlet 1034, and a pump opening 1036. The housing assembly further comprises an inlet pipe 1038 that defines the housing inlet 1032. A liquid 1040 is contained within the collection chamber 1030. The housing assembly 1022 further comprises a pressure transducer 1042 mounted within the collection chamber 1030 to determine a level 1044 of the liquid 1040 as will be described in further detail below. The example housing assembly 1022 further comprises an outlet tray 1046.

The drum assembly 1024 comprises a drum member 1050 having a cylindrical wall 1052 and first and second end walls 1054 and 1056. Perforations 1058 are formed in the cylindrical wall 1052. The first end wall defines a drum inlet opening 1060, and the second end wall 1056 defines a drum outlet opening 1062. The drum assembly 1024 further comprises a drum outlet pipe 1064 rigidly secured to the second end wall 1056 around the drum outlet opening 1062. The example drum assembly 1024 defines a drum chamber 1066. The drum assembly 1024 further comprises a main screw flight 1070 and an outlet screw flight 1072. FIGS. 13 and 14 illustrate that the drum assembly 1024 further comprises a ramp wall 1074 arranged adjacent to a portion of the main flight 1070 adjacent to the drum outlet opening 1062.

FIG. 13 illustrates that the drive system 1026 comprises a drive motor 1080, a drive pulley 1082, and a drive belt 1084. The drive motor 1080 rotates the drive pulley 1082, and the drive belt 1084 extends between the drive pulley 1082 and the drum outlet pipe 1064 such that rotation of the drive pulley 1082 causes axial rotation of the drum assembly 1024 about the rotation axis A. The drive belt 1084 thus rotatably supports one end of the drum assembly 1024, and the housing inlet pipe 1038 engages the drum inlet opening 1060 to support a second end of the drum assembly 1024. FIG. 14 further illustrates that rollers 1086 are arranged to prevent movement of a longitudinal axis of the of the drum member 1050 out of alignment with a rotation axis A.

FIG. 13 further illustrates that the housing assembly 1022 supports the drum assembly 1024 such that a submerged portion 1050*a* of the drum member 1050 is below the liquid level 1044 defined by the collection chamber 1030. Further, the liquid level 1044 is arranged such that the liquid within the collection chamber 1030 extends from a bottom most portion 1050*b* of the drum member 1050 approximately half-way up a radial dimension of the screw flight 1070 such that only a submerged portion 1070*a* of the flight 1070 is below the liquid level 1044 and a non-submerged portion 1070*b* of the flight 1070 remains above the liquid level 1044 as depicted in FIG. 13.

To use the example separator system 1020, feed material 1090 comprising solids 1092, sand 1094, and liquids 1096 is allowed to flow through the housing inlet port 1032 and into the drum chamber 1066. The drum assembly 1024 is supported by the housing assembly 1022 such that the drum chamber 1066 is entirely within the collection chamber 1030. Further, the liquid level 1044 is maintained by controlling the flow of liquid into and out of the collection chamber 1030 using the pressure transducer 1042 such that a portion of the drum chamber 1066 is flooded. The example liquid level 1044 is controlled such that the liquid level extends approximately two-thirds of the radial dimension of the main flights 1070 at the lowest point in the rotation path defined by the main flights 1070. Accordingly, the feed material 1090 is mixed within the drum chamber 1066 with the liquid 1040 contained by the collection chamber 1030.

The interaction between the feed material 1090 and the liquid 1040 as the drive system 1026 rotates the drum assembly 1024 allows the sand 1094 portion of the feed material to be carried out of the drum chamber 1066 through the perforations 1058. However, the perforations 1058 are sized and dimensioned to inhibit flow of the solids 1092 portion of the feed material 1090 through the perforations 1058. Instead, the solids 1092 portion is transported along the drum chamber 1066 by the main flights 1070 towards the pipe outlet opening 1062. The ramp surface 1074 lifts the solids out of the drum chamber 1066 to the drum outlet pipe 1064. The secondary flights 1072 displace the solids out of the drum assembly 1024 and into the output tray 1046 for further movement and/or processing as will be described in detail below. A pump (not shown in FIGS. 13 and 14) is connected to the pump outlet 1036 to draw sand and liquid out of the collection chamber 1030. An auger like the auger used in the example separation system depicted in FIGS. 1 and 2 above may be used instead of a pump in the example system 1020. Further, the auger depicted in FIGS. 1 and 2 above may be replaced with a pump to withdraw sand from the collection chambers described therein.

XI. Example Single-Stage Separation System

Figure 15:
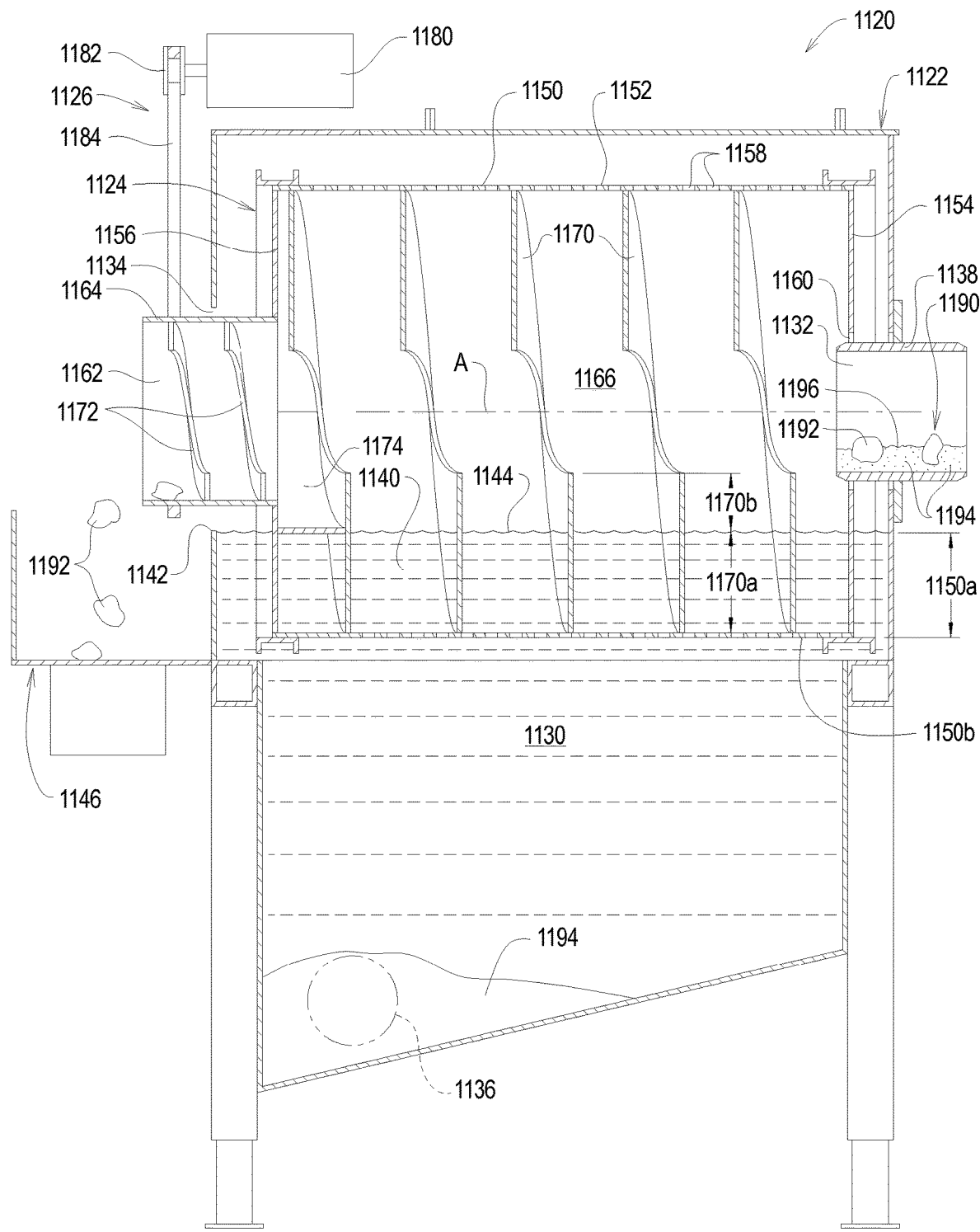
FIG. 15 is a side elevation cutaway view of a separation system of the present invention.

Referring now to FIG. 15 of the drawing, depicted therein is another example separation system 1120 constructed in accordance with the principles of the present invention. The example separation system 1120 comprises a housing assembly 1122, a drum assembly 1124, and a drive system 1126.

The example housing assembly 1122 defines a collection chamber 1130, a housing inlet 1132, a housing outlet 1134, and a pump opening 1136. The housing assembly further comprises an inlet pipe 1138 that defines the housing inlet 1132. A liquid 1140 is contained within the collection chamber 1130. The housing assembly 1122 further comprises a weir edge 1142 defining a portion of the collection chamber 1130 to determine a level 1144 of the liquid 1140 as will be described in further detail below. The example housing assembly 1122 further comprises an outlet tray 1146.

The drum assembly 1124 comprises a drum member 1150 having a cylindrical wall 1152 and first and second end walls 1154 and 1156. Perforations 1158 are formed in the cylindrical wall 1152. The first end wall defines a drum inlet opening 1160, and the second end wall 1156 defines a drum outlet opening 1162. The drum assembly 1124 further comprises a drum outlet pipe 1164 rigidly secured to the second end wall 1156 around the drum outlet opening 1162. The example drum assembly 1124 defines a drum chamber 1166. The drum assembly 1124 further comprises a main screw flight 1170 and an outlet screw flight 1172. FIG. 15 illustrates that the drum assembly 1124 further comprises a ramp wall 1174 arranged adjacent to a portion of the main flight 1170 adjacent to the drum outlet opening 1162.

FIG. 15 illustrates that the drive system 1126 comprises a drive motor 1180, a drive pulley 1182, and a drive belt 1184. The drive motor 1180 rotates the drive pulley 1182, and the drive belt 1184 extends between the drive pulley 1182 and the drum outlet pipe 1164 such that rotation of the drive pulley 1182 causes axial rotation of the drum assembly 1124 about the rotation axis A. The drive belt 1184 thus rotatably supports one end of the drum assembly 1124, and the housing inlet pipe 1138 engages the drum inlet opening 1160 to support a second end of the drum assembly 1124. Rollers (not shown in FIG. 15) are arranged to prevent movement of a longitudinal axis of the of the drum member 1150 out of alignment with a rotation axis A.

FIG. 15 further illustrates that the housing assembly 1122 supports the drum assembly 1124 such that a submerged portion 1150*a* of the drum member 1150 is below the liquid level 1144 defined by the collection chamber 1130. Further, the liquid level 1144 is arranged such that the liquid within the collection chamber 1130 extends from a bottom most portion 1150*b* of the drum member 1150 approximately half-way up a radial dimension of the screw flight 1170 such that only a submerged portion 1170*a* of the flight 1170 is below the liquid level 1144 and a non-submerged portion 1170*b* of the flight 1170 remains above the liquid level 1144 as depicted in FIG. 13.

Referring now again to FIG. 15, the operation of the example separator system 1120 will now be described in further detail. Feed material 1190 comprising solids 1192, sand 1194, and liquids 1196 is allowed to flow through the housing inlet port 1132 and into the drum chamber 1166. The drum assembly 1124 is supported by the housing assembly 1122 such that the drum chamber 1166 is entirely within the collection chamber 1130. Further, the weir edge 1142 maintains the liquid level 1144 such that a portion of the drum chamber 1166 is flooded. The example weir edge 1142 controls the liquid level 1144 such that the liquid level extends approximately two-thirds of the radial dimension of the main flights 1170 at the lowest point in the rotation path defined by the main flights 1170. Accordingly, the feed material 1190 is mixed within the drum chamber 1166 with the liquid 1140 contained by the collection chamber 1130.

The interaction between the feed material 1190 and the liquid 1140 as the drive system 1126 rotates the drum assembly 1124 allows the sand 1194 portion of the feed material to be carried out of the drum chamber 1166 through the perforations 1158. However, the perforations 1158 are sized and dimensioned to inhibit flow of the solids 1192 portion of the feed material 1190 through the perforations 1158. Instead, the solids 1192 portion is transported along the drum chamber 1166 by the main flights 1170 towards the pipe outlet opening 1162. The ramp surface 1174 lifts the solids out of the drum chamber 1166 to the drum outlet pipe 1164. The secondary flights 1172 displace the solids out of the drum assembly 1124 and into the output tray 1146 for further movement and/or processing as will be described in detail below. A pump (not shown in FIG. 15) is connected to the pump outlet 1136 to draw sand and liquid out of the collection chamber 1130. Again, an auger like the auger used in the example separation system depicted in FIGS. 1 and 2 above may be used instead of a pump in the example system 1120.

XII. Example Dairy System Using Dual-Stage Separation System

Figure 16:
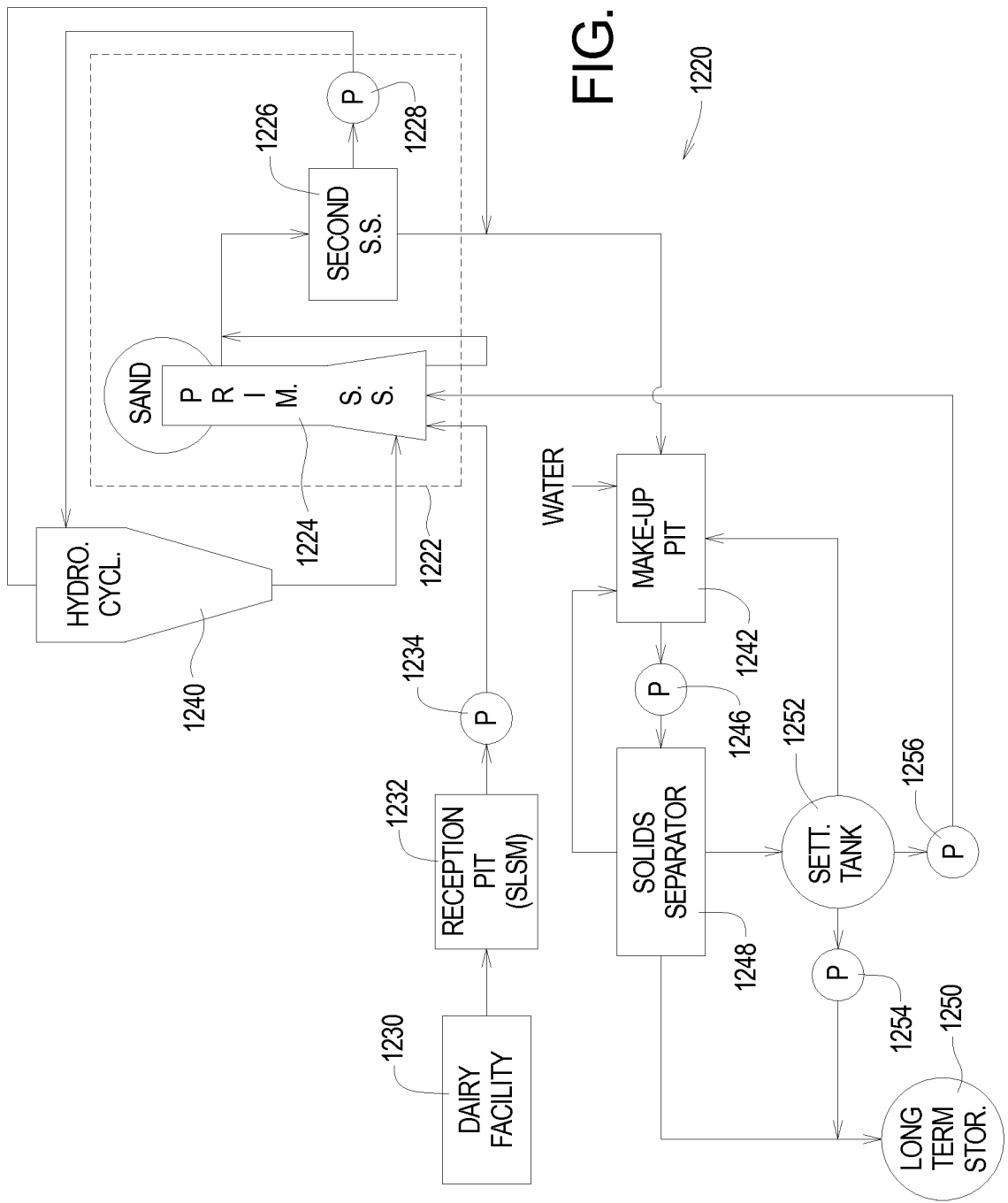
FIGS. 16 and 17 are block system diagrams of a dairy system incorporating a separation system of the present invention.

FIG. 16 illustrates a dairy system 1220 employing a dual-stage separation system 1222 of the present invention. The example dual-stage separation system 1222 comprises a first stage separator system 1224 that may be or incorporate any of the first stage separator systems described above with reference to FIGS. 3-12 above. The example dual-stage separation system 1222 further comprises a second stage separator system 1226 that may be or incorporate any of the separator systems described in FIGS. 1 and 2, FIGS. 13 and 14, and FIG. 15 described above. FIG. 16 illustrates a pump 1228 that is operatively connected to the pump outlet 1036 or 1136 of the separator systems 1020 and 1120 described above.

In the example dairy system 1220, a dairy facility 1230 generates waste that is collected in a reception pit 1232. A pump 1234 moves the collected waste into the first stage separator 1224.

The example dairy system 1220 further comprises a hydro cyclone 1240 to process the sand and liquid drawn by the pump 1228 from the second stage separator system 1226. Liquid from the top of the hydro cyclone 1130 may be mixed with the solids output from the second stage separator 1226.

In the example dairy system 1220, the solids output of the second stage separator is moved to a make-up pit 1242 and then pumped by a pump 1246 into a solids separator 1248 that extracts water from the solids. The solids are then placed in long term storage 1250. Liquids from the solids separator 1248 are directed to a settling tank 1252. Solids from the settling tank 1252 are pumped to long term storage 1250 by a pump 1254. A pump 1256 pumps liquid from the settling tank 1252 to the primary separator 1224.

XIII. Example Dairy System Using Dual-Stage Separation System

Figure 17:
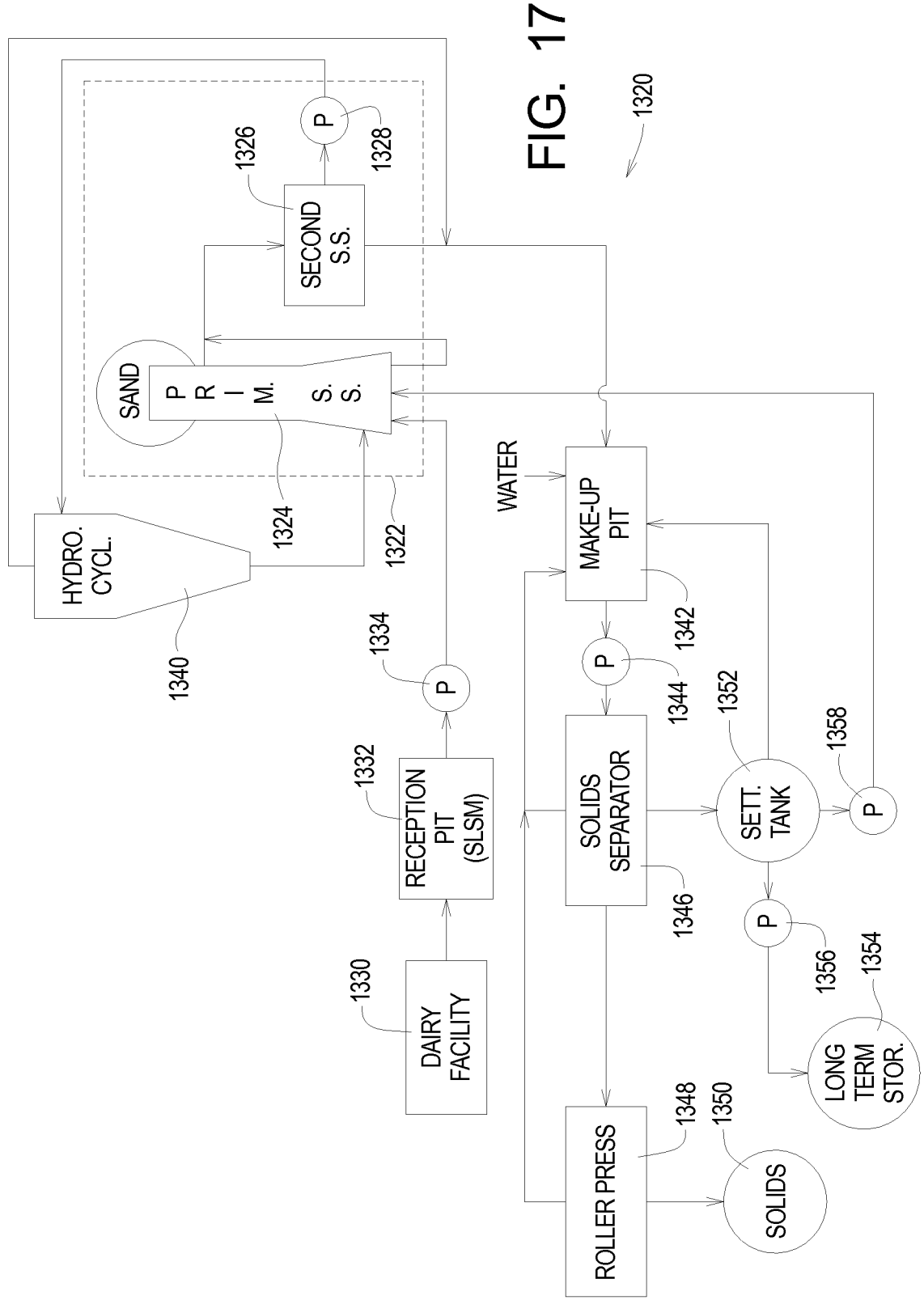

FIG. 17 illustrates a dairy system 1320 employing a dual-stage separation system 1322 of the present invention. The example dual-stage separation system 1322 comprises a first stage separator system 1024 that may be or incorporate any of the first stage separator systems described above with reference to FIGS. 3-12 above. The example dual-stage separation system 1322 further comprises a second stage separator system 1326 that may be or incorporate any of the separator systems described in FIGS. 1 and 2, FIGS. 13 and 14, and FIG. 15 described above. FIG. 17 illustrates a pump 1328 that is operatively connected to the pump outlet 1036 or 1136 of the separator systems 1020 and 1120 described above.

In the example dairy system 1320, a dairy facility 1330 generates waste that is collected in a reception pit 1332. A pump 1334 moves the collected waste into the first stage separator 1324.

The example dairy system 1320 further comprises a hydro cyclone 1340 to process the sand and liquid drawn by the pump 1328 from the second stage separator system 1326. Liquid from the top of the hydro cyclone 1130 may be mixed with the solids output from the second stage separator 1326.

In the example dairy system 1320, the solids output of the second stage separator is moved to a make-up pit 1342 and then pumped by a pump 1344 into a solids separator 1346 that extracts water from the solids. The solids are then further processed by a roller press 1348 to obtain dry solids 1350.

Liquids from the solids separator 1346 are directed to a settling tank 1352. Solids from the settling tank 1352 are pumped to long term storage 1354 by a pump 1356. A pump 1358 pumps liquid from the settling tank 1352 to the primary separator 1324.

XIV. Example Single-Stage Separation System

Figure 18:
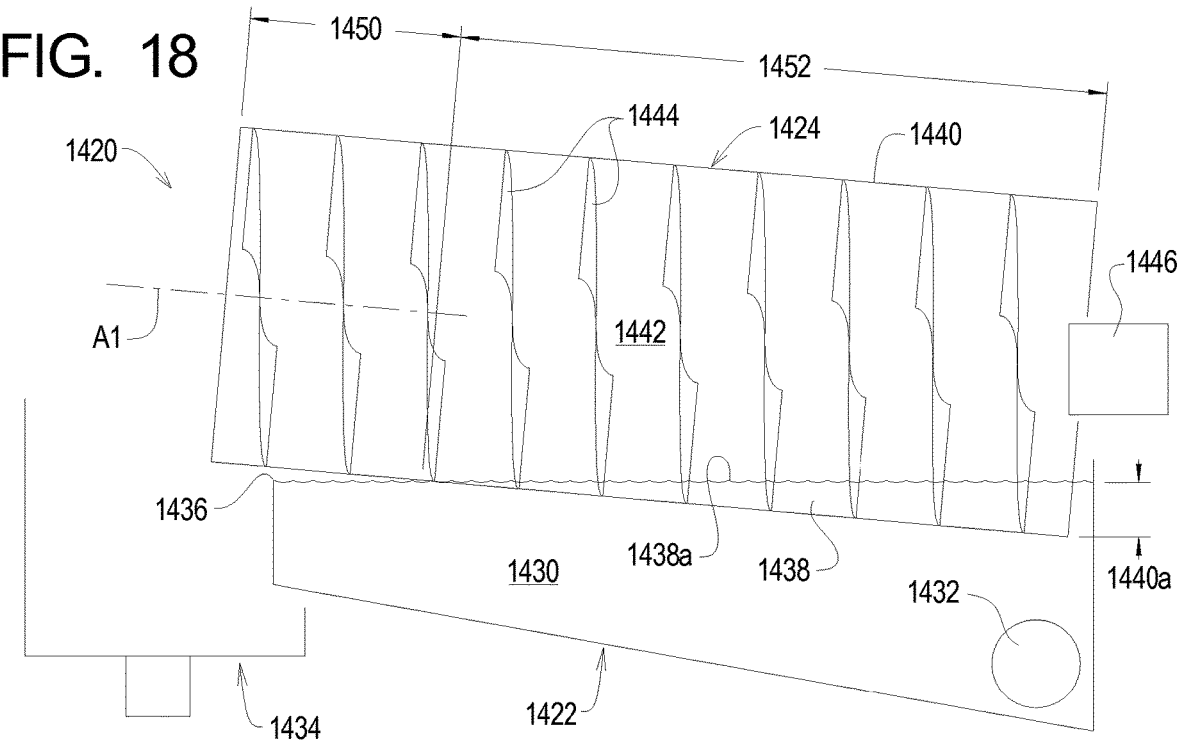
FIG. 18 is a somewhat schematic side elevation view of a separation system of the present invention.

Referring now to FIG. 18 of the drawing, depicted therein is another example separation system 1420 constructed in accordance with the principles of the present invention. The example separation system 1420 comprises a housing assembly 1422, a drum assembly 1424, and a drive system (not shown in FIG. 18). The drive system used by the example separation system 1420 may be similar to that depicted in FIGS. 2, 13, and 15.

The example housing assembly 1422 defines a collection chamber 1430 and a pump opening 1432. The housing assembly further comprises an outlet tray 1434 and defines a weir edge 1436. A liquid 1438 is contained within the collection chamber 1430 and defines a liquid level 1438a. The weir edge 1436 determines the liquid level 1438a.

The drum assembly 1424 comprises a perforated drum member 1440 defining a drum chamber 1442. The drum assembly 1424 further comprises a main screw flight 1444 and an inlet port 1446. A longitudinal axis A1 of the drum member 1440 is set at an angle with respect to the water level 1438a and thus with respect to horizontal. The drum member 1440 is further located with respect to the water level 1438a such that the drum chamber 1442 defines a "dry" (non-submerged) section 1450 and a wet (submerged) section 1452. FIG. 18 further illustrates that the housing assembly 1422 supports the drum assembly 1424 such that a submerged portion 1440a of the drum member 1440 is below the liquid level 1438a of the liquid 1438. Further, the liquid level 1438a is arranged such that the liquid 1438 within the collection chamber 1430 extends along at least a portion of a radial dimension of the screw flight 1444 in the wet or submerged section 1452.

The operation of the example separator system 1420 will now be described in further detail. Feed material comprising solids, sand, and liquids is allowed to flow through the inlet port 1446 and into the drum chamber 1442. As the drum assembly 1424 is rotated, the feed material is initially displaced through the wet section 1452 of the drum chamber 1442 where the feed material is mixed with the liquid 1438. As the feed material, less a substantial portion of the sand in the feed material, is displaced through the dry section 1450 of the drum chamber 1442, water drains out of the remaining feed material. The remaining feed material is then deposited onto the output tray 1434. In addition to separating sand from solids, the example separator system 1420 thus additionally at least partially dries the solids.

XV. Example Single-Stage Separation System

Figure 19:
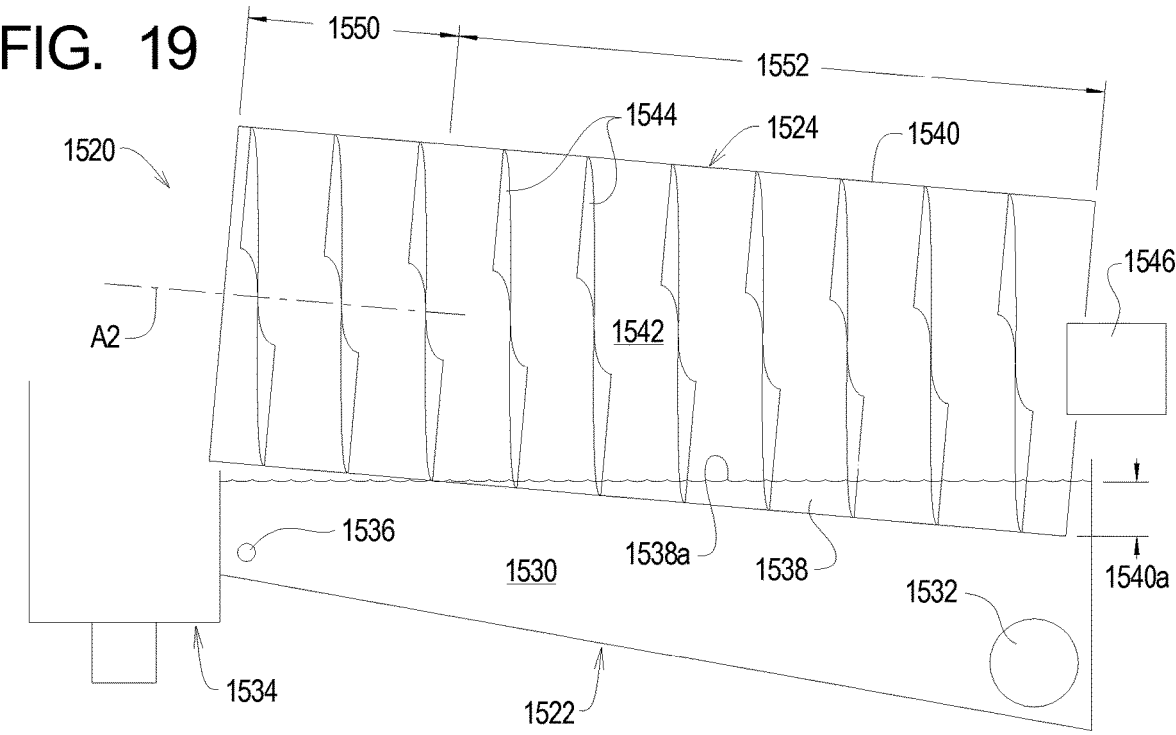
FIG. 19 is a somewhat schematic side elevation view of a separation system of the present invention.

Referring now to FIG. 19 of the drawing, depicted therein is another example separation system 1520 constructed in accordance with the principles of the present invention. The example separation system 1520 comprises a housing assembly 1522, a drum assembly 1524, and a drive system (not shown in FIG. 18). The drive system used by the example separation system 1520 may be similar to that depicted in FIGS. 2, 13, and 15.

The example housing assembly 1522 defines a collection chamber 1530 and a pump opening 1532. The housing assembly further comprises an outlet tray 1534 and a pressure transducer 1536. A liquid 1538 is contained within the collection chamber 1530 and defines a liquid level 1538a. The pressure transducer 1536 is used to control the liquid level 1538a.

The drum assembly 1524 comprises a perforated drum member 1540 defining a drum chamber 1542. The drum assembly 1524 further comprises a main screw flight 1544 and an inlet port 1546. A longitudinal axis A2 of the drum member 1540 is set at an angle with respect to the water level 1538a and thus with respect to horizontal. The drum member 1540 is further located with respect to the water level 1538a such that the drum chamber 1542 defines a dry section 1550 and a wet section 1552. FIG. 19 further illustrates that the housing assembly 1522 supports the drum assembly 1524 such that a submerged portion 1540a of the drum member 1540 is below the liquid level 1538a of the liquid 1538. Further, the liquid level 1538a is arranged such that the liquid 1538 within the collection chamber 1530 extends along at least a portion of a radial dimension of the screw flight 1544 in the wet or submerged section 1552.

The operation of the example separator system 1520 will now be described in further detail. Feed material comprising solids, sand, and liquids is allowed to flow through the inlet port 1546 and into the drum chamber 1542. As the drum assembly 1524 is rotated, the feed material is initially displaced through the wet section 1552 of the drum chamber 1542 where the feed material is mixed with the liquid 1538. As the feed material, less a substantial portion of the sand in the feed material, is displaced through the dry section 1550 of the drum chamber 1542, water drains out of the remaining feed material. The remaining feed material is then deposited onto the output tray 1534. In addition to separating sand from solids, the example separator system 1520 thus additionally at least partially dries the solids.

XVI. Example Single-Stage Separation System

Referring now to FIG. 20 of the drawing, depicted therein is another example separation system 1620 constructed in accordance with the principles of the present invention. The example separation system 1620 comprises a housing assembly 1622, a drum assembly 1624, and a drive system (not shown in FIG. 18). The drive system used by the example separation system 1620 may be similar to that depicted in FIGS. 2, 13, and 15.

The example housing assembly 1622 defines a collection chamber 1630 and a pump opening 1632. The housing assembly further comprises a pressure transducer 1636. A liquid 1638 is contained within the collection chamber 1630 and defines a liquid level 1638a. The pressure transducer 1636 is used to control the liquid level 1638a.

The drum assembly 1624 comprises a perforated drum member 1640 defining a drum chamber 1642. The drum assembly 1624 further comprises a main screw flight 1644 and an inlet port 1646. A longitudinal axis A3 of the drum member 1640 is set at an angle with respect to the water level 1638a and thus with respect to horizontal. The drum member 1640 is further located with respect to the water level 1638a such that the drum chamber 1642 defines a dry section 1650 and a wet section 1652. FIG. 20 further illustrates that the housing assembly 1622 supports the drum assembly 1624 such that a submerged portion 1640a of the drum member 1640 is below the liquid level 1638a of the liquid 1638. Further, the liquid level 1638a is arranged such that the liquid 1638 within the collection chamber 1630 extends along at least a portion of a radial dimension of the screw flight 1644 in the wet or submerged section 1652.

The operation of the example separator system 1620 will now be described in further detail. Feed material comprising solids, sand, and liquids is allowed to flow through the inlet port 1646 and into the drum chamber 1642. As the drum assembly 1624 is rotated, the feed material is initially displaced through the wet section 1652 of the drum chamber 1642 where the feed material is mixed with the liquid 1638. As the feed material, less a substantial portion of the sand in the feed material, is displaced through the dry section 1650 of the drum chamber 1642, water drains out of the remaining feed material.

The remaining feed material is then fed into a roller press 1660 comprising a feed tray 1662, a lower roller 1664, and an upper roller 1666. The solids in the remaining feed material exiting the drum assembly 1624 is fed onto the feed tray 1662 and between the rollers 1664 and 1666 such that the roller press 1660 extracts additional liquid from the solids. The roller press may be substituted for the output tray of any of the separator systems described herein.

What is claimed is:

1. A separation system for separating feed material into first solids and second solids, the separation system comprising:
a housing defining a collection chamber and a weir edge, where the weir edge defines a liquid level of feed material within the collection chamber;
a drum assembly comprising
a drum member defining a perforated cylindrical wall, a drum inlet port, a drum outlet opening, and a drum chamber, and
at least one screw flight within the drum member; and
a drive assembly for rotating the drum assembly relative to the housing; wherein
the drum assembly is at least partly arranged within the collection chamber such that
at least a portion of the screw flight is below the liquid level along an entire length of the screw flight, and
the drum outlet opening is above the liquid level;

as the drum assembly rotates relative to the housing, feed material is introduced into the drum chamber through drum inlet port such that
the first solids of the feed material exit the drum assembly through the perforated cylindrical wall of the drum member and collect at the bottom of the collection chamber, and
the second solids float on the feed material such that the screw flight displaces the second solids floating on the feed material from the inlet port and to the drum outlet opening to cause the second solids of the feed material to exit the collection chamber through the drum outlet opening.

2. A separation system as recited in claim 1, in which the drum assembly further comprises at least one lifting surface for lifting the second solids of the feed material out of the collection chamber through the exit opening.

3. A separation system as recited in claim 1, in which the drum inlet port is above the liquid level of the feed material.

4. A separation system as recited in claim 1, further comprising an auxiliary separator for generating the feed material from a slurry of waste material.

5. A separation system as recited in claim 1, in which the feed material is a slurry of waste material.

6. A separation system as recited in claim 1, in which:
the first solids primarily comprises sand; and
the second solids primarily comprises floating solids.

7. A method of separating feed material into first solids and second solids comprising the steps of:
providing a housing defining a collection chamber and a weir edge;
providing a drum assembly comprising
a drum member defining a perforated cylindrical wall, a drum inlet port, a drum outlet opening, and a drum chamber; and
at least one screw flight within the drum member;
arranging feed material within the collection chamber such that the weir edge defines a liquid level;
supporting the drum assembly at least partly within the collection chamber such that
at least a portion of the screw flight is below the liquid level, and
the drum outlet opening is above the liquid level; and
rotating the drum assembly relative to the housing while introducing feed material into the drum chamber through the drum inlet port such that
the first solids of the feed material exit the drum assembly through the perforated cylindrical wall of the drum member and collect at the bottom of the collection chamber, and
the second solids float on the feed material such that the screw flight displaces the second solids floating on the feed material from the inlet port and to the drum outlet opening to cause such that the second solids of the feed material exit the collection chamber through the drum outlet opening.

8. A method as recited in claim 7, in which the step of providing the drum assembly further comprises the step of providing at least one lifting surface, the method further comprising the step of causing the at least one lifting surface to lift the second portion of the feed material out of the collection chamber through the exit opening.

9. A method as recited in claim 7, further comprising the step supporting the drum assembly comprises the step of supporting the drum assembly such that the drum inlet port is above the liquid level of the feed material.

10. A method as recited in claim 7, further comprising the step of generating the feed material by separating the feed material from a slurry of waste material.

11. A separation system for separating feed material comprising liquids, sand, and floating solids, the separation system comprising:
a housing defining a collection chamber and a weir edge, where the weir edge defines a liquid level of feed material within the collection chamber;
a drum assembly comprising
a drum member defining a perforated cylindrical wall, a drum inlet port, a drum outlet opening, and a drum chamber, and
at least one screw flight within the drum member; and
a drive assembly for rotating the drum assembly relative to the housing; wherein
the drum assembly is at least partly arranged within the collection chamber such that
at least a portion of the screw flight is below the liquid level along an entire length of the screw flight, and
the drum outlet opening is above the liquid level;
as the drum assembly rotates relative to the housing, feed material is introduced into the drum chamber through drum inlet port such that
the first liquids and sand of the feed material exit the drum assembly through the perforated cylindrical wall of the drum member and collect at the bottom of the collection chamber, and
the floating solids float on the feed material such that the screw flight displaces the floating solids of the feed material from the inlet port and to the outlet opening to cause the floating solids of the feed material to exit the collection chamber through the drum outlet opening.

12. A separation system as recited in claim 11, in which the drum assembly further comprises at least one lifting surface for lifting the second portion of the feed material out of the collection chamber through the exit end.

13. A separation system as recited in claim 11, in which the drum inlet port is above the liquid level of the feed material.

14. A separation system as recited in claim 11, further comprising an auxiliary separator for generating the feed material from a slurry of waste material.

* * * * *